US010992638B1

(12) United States Patent
Varan et al.

(10) Patent No.: US 10,992,638 B1
(45) Date of Patent: Apr. 27, 2021

(54) NETWORK ADDRESS TRANSLATION BASED ON LOGICAL CHANNEL IMPLEMENTATION IN A SHARED WIRELESS NETWORK

(71) Applicant: Amazon Technologies, Inc., Seattle, WA (US)

(72) Inventors: Burak Varan, Cupertino, CA (US); Sanjeev Gupta, Fremont, CA (US); Ravi Manghirmalani, Fremont, CA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 16/895,852

(22) Filed: Jun. 8, 2020

(51) Int. Cl.
*G06F 15/16* (2006.01)
*H04L 29/12* (2006.01)

(52) U.S. Cl.
CPC ........ *H04L 61/2514* (2013.01); *H04L 61/106* (2013.01); *H04L 61/2557* (2013.01); *H04L 61/2567* (2013.01)

(58) Field of Classification Search
CPC ............................................... H04L 61/25141
USPC .......................................................... 709/245
See application file for complete search history.

(56) References Cited

U.S. PATENT DOCUMENTS

| | | | | |
|---|---|---|---|---|
| 7,302,496 B1* | 11/2007 | Metzger | ............ | H04L 29/12452 370/236 |
| 7,411,967 B2* | 8/2008 | Thubert | .............. | H04L 12/2898 370/352 |
| 8,363,650 B2* | 1/2013 | Rao | .................... | H04L 29/12367 370/389 |
| 9,628,294 B1* | 4/2017 | Brandwine | ........... | H04L 69/167 |
| 9,807,057 B1* | 10/2017 | Deb | ...................... | H04L 61/2514 |
| 10,212,161 B1* | 2/2019 | Schaefer | ................ | H04W 12/08 |
| 2003/0172184 A1* | 9/2003 | Kong | ................... | H04L 61/1511 709/245 |
| 2003/0214955 A1* | 11/2003 | Kim | ........................ | H04L 63/08 370/400 |
| 2004/0218611 A1* | 11/2004 | Kim | ..................... | H04L 12/4641 370/401 |
| 2005/0111486 A1* | 5/2005 | Lee | ...................... | H04L 12/2818 370/465 |
| 2006/0029063 A1* | 2/2006 | Rao | ...................... | H04L 12/2898 370/389 |
| 2006/0203749 A1* | 9/2006 | Tseng | ...................... | H04L 12/18 370/260 |

(Continued)

*Primary Examiner* — Hamza N Algibhah
(74) *Attorney, Agent, or Firm* — Lowenstein Sandler LLP

(57) ABSTRACT

Technologies directed to network address translation based on logical channels in a shared private network with a single ingress to an ISP and multiple customer devices are described. One method receives a first public IP address assigned to an endpoint device by an ISP. The method creates a sub-interface on a WAN interface and adds a first rule that translates the first public IP address to a first private IP address assigned to the customer STA and a second rule that translates the first private IP address to the second public IP address. The first customer STA creates a second sub-interface between the customer STA and the endpoint device, adds a third rule that translates the first private IP address to a second private IP address assigned to the first endpoint device, and adds a fourth rule that translates the second private IP address to the first private IP address.

20 Claims, 9 Drawing Sheets

(56) References Cited

U.S. PATENT DOCUMENTS

| | | | | |
|---|---|---|---|---|
| 2006/0251088 | A1* | 11/2006 | Thubert | H04L 61/2535 |
| | | | | 370/401 |
| 2008/0196098 | A1* | 8/2008 | Cottrell | H04L 63/0414 |
| | | | | 726/12 |
| 2009/0147795 | A1* | 6/2009 | Mevissen | H04L 29/06 |
| | | | | 370/401 |
| 2014/0325637 | A1* | 10/2014 | Zhang | H04L 61/2535 |
| | | | | 726/15 |
| 2015/0295885 | A1* | 10/2015 | Congdon | H04L 45/7453 |
| | | | | 370/392 |
| 2018/0183755 | A1* | 6/2018 | Mitchell | H04L 61/1541 |
| 2019/0097968 | A1* | 3/2019 | Inforzato | H04L 45/745 |
| 2020/0162332 | A1* | 5/2020 | Liguori | G06F 9/45558 |

* cited by examiner

NETWORK ADDRESS TRANSLATION BASED ON LOGICAL CHANNEL IMPLEMENTATION IN A SHARED WIRELESS NETWORK

BACKGROUND

A large and growing population of users is enjoying entertainment through the consumption of digital media items, such as music, movies, images, electronic books, and so on. The users employ various electronic devices to consume such media items. Among these electronic devices (referred to herein as endpoint devices, user devices, clients, client devices, or user equipment) are electronic book readers, cellular telephones, Personal Digital Assistants (PDAs), portable media players, tablet computers, netbooks, laptops, and the like. These electronic devices wirelessly communicate with a communications infrastructure to enable the consumption of the digital media items. In order to communicate with other devices wirelessly, these electronic devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
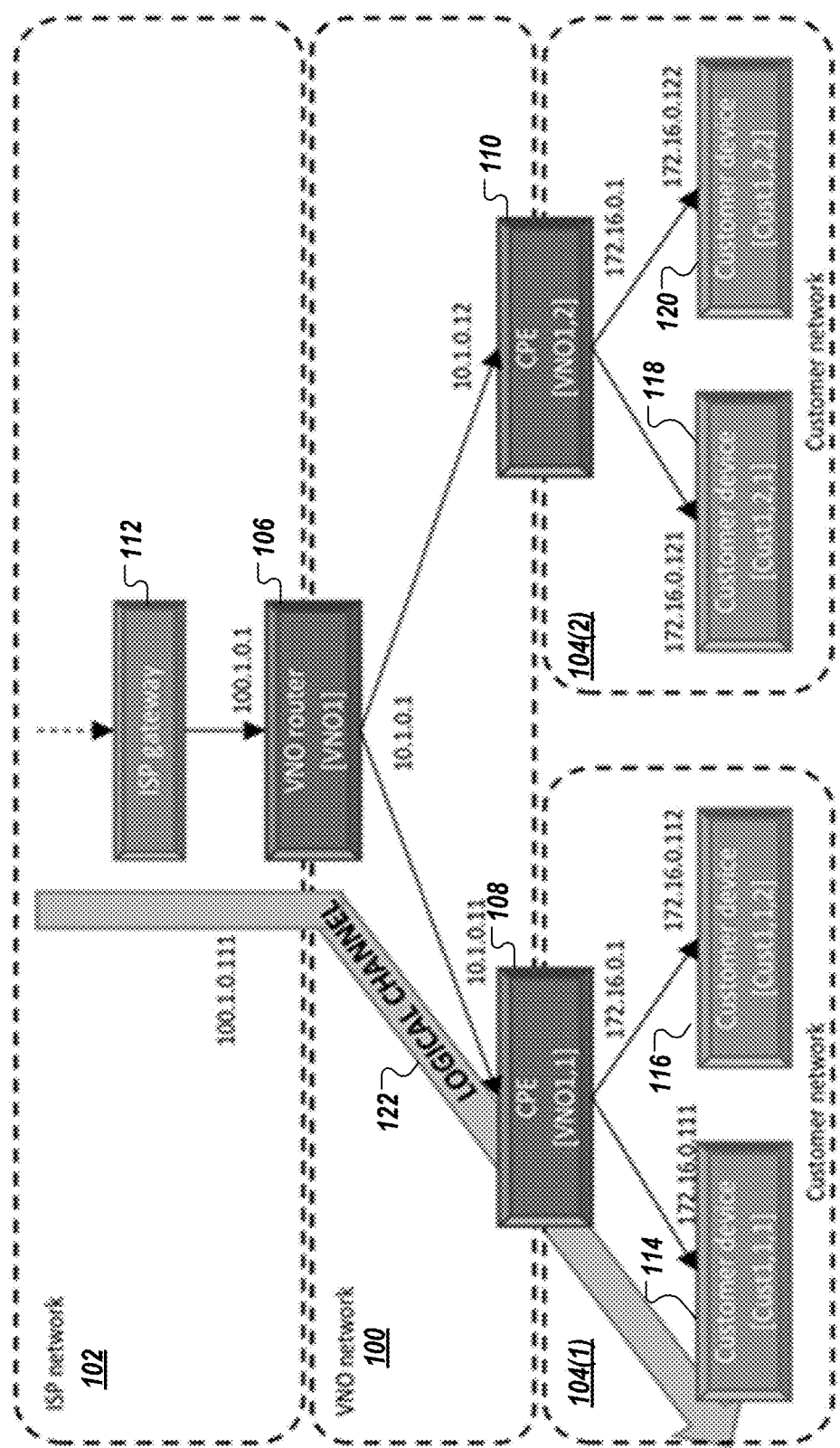
FIG. 1 is a network diagram of a shared wireless network with a single ISP ingress to an ISP network and multiple customer premises equipment (CPE) nodes for multiple customer networks according to one embodiment.

Technologies directed to network address translation based on logical channels in a shared private network with a single ingress to an Internet Service Provider (ISP) and multiple customer devices are described. The 2.4 GHz and 5 GHz industrial, scientific, and medical (ISM) radio bands allow unlicensed wireless communications. Due to its unlicensed nature, many short ranged, low power wireless communication systems operate in these frequency bands. As such, there is a limited de-license spectrum in various locations, including India (e.g., 2.4 GHz ISM and 5 GHz U-NII bands). Various devices are described herein that include wireless local area network (WLAN) radios operate in the 2.4 GHz and 5 GHz U-NII-1 bands and utilize various WLAN protocols, such as the Wi-Fi® protocols (e.g., 802.11n, 802.11ac, or the like). The radios can utilize 2×2 spatial multiplexing MIMO and channel bandwidths from 20 MHz to 40 MHz. The radios can see all 5.x GHz channels, including Dynamic Frequency Selection (DFS) channels and can operates at an Equivalent Isotropically Radiated Power (EIRP) up to 36 dBmi, depending on the channel. The devices described herein can be deployed in a wireless network having a hierarchical topology between ISP ingress to a subscriber (referred to herein as a customer). In various embodiments, the wireless network is logically organized as a cascaded star topology as described in more detail below.

The network architecture described herein is capable of providing Video on Demand (VoD) and Internet services to customers at scale. The network architecture described herein can be deployed in areas with limited, traditional ISP infrastructure, such as in India, for example. These services can be enabled by a combination of wired ingress, wireless connectivity, and tiered content caching in the network architecture described herein. At a high level, the network architecture of the wireless networks described herein are logically organized into hierarchical units, referred to herein as cell units, nodes, and devices, such as described and illustrated with respect to FIG. 1.

The embodiments described herein relate to a network architecture to deliver both video on demand (VoD) and internet to customers in locations with limited internet infrastructure. The network architecture includes technology for distribution of VoD and Internet services to the customers using wired and wireless links. The network devices are organized into three logical units known as nodes: base station nodes (BSNs), relay nodes (RLNs), and customer premises equipment (CPE) nodes (also referred to as Home access node (HAN)). Each node supports a unique set of network functions. The CPE node provides connectivity for in-home customer devices (FireTV, laptop) to the outdoor wireless access network. RLN aggregate the wireless access traffic from the CPEs and pass this data back to a central BSN over a wireless distribution network. The BSN aggregates both the RLN wireless distribution and local wireless access traffic to a fiber ingress point. The devices at the nodes can be manufactured as a common device type and programmed according to any of the following device roles: a router (RT) role, a base station (BS) role, a gateway (GW) role, a relay (RL) role, or a customer station (STA) role. That is, the devices can each include identical hardware and can each be programmed to operate as a one of a RT, a BS, a GW, a RL, a customer STA, a NAS, or the like.

In most cases, an ISP needs to know specific information about a customer devices for regulatory requirements. Because the private wireless network has one single connection from the ISP and assigns all devices in the wireless network a private IP address according to an IP addressing scheme that is completely internal to a virtual network operator (VNO), the private wireless network hides individual device information. Aspects of the present disclosure provide a solution that does not expose the private wireless network to outside sources for security by assigning every customer device with a unique public IP addressed provided by the ISP and creating a logical channel between a router device and the respective customer device. The router device provides a table containing the public IP addresses and customer device identifiers (IDs) to the ISP so the ISP can record connections on a per-customer basis, as well as per-customer network traffic and statistics. Each logical channel is implemented in three steps on each device, including 1) creating a sub-interface on the wide area network (WAN) interface of the device, adding a Source Network Address Translation (SNAT) rule, and adding a Designation Network Address Translation (DNAT) rule.

A VNO can use other telecommunications suppliers' infrastructure to provide network services to its customers. The VNO and ISP must comply with legal requirements such as Internet Protocol Detail Record (IPDR) logging. IPDR can be used by network operators to collect data about their customers' network usage and activities. This data can later be used by the law enforcement authorities to determine if there was any instance of illegal activity. A VNO must provide a way by which the ISP can collect and correlate this information on a per-customer basis.

FIG. 1 is a network diagram of a shared wireless network 100 with a single ISP ingress to an ISP network 102 and multiple customer premises equipment (CPE) nodes for multiple customer networks 104 according to one embodiment. The shared wireless network 100 can also be referred to as a VNO network, as the shared wireless network 100 is under the control of a VNO. That is, the VNO can control a router device 106 and multiple CPE devices, including a first customer station (STA) 108 and a second customer STA 110. It should be noted that one or more devices can be part of the shared wireless network 100, such as between the router device 106, and the customer STAs 108, 110, such a BS device, a gateway device, a relay device, or the like.

The VNO router (router device 106) and CPE nodes are maintained by a VNO. Internet backhaul is provided by the ISP network 102 and the VNO has no control over an ISP gateway device 112, but can remotely and locally control the VNO router and the CPE nodes. The ISP gateway device 112 is a device that operates as a single ISP ingress for the shared wireless network 100. Every customer can be provided with a customer router, referred to herein as a customer STA at the CPE node, which they can customize to an extent. For example, the customer can change the Service Set Identifier (SSID), passphrase, or the like, of the customer STA. The VNO has a control channel to each CPE node and uses the control channel to control these customer STA and collect data from them. The customer devices, referred to herein as customer endpoint devices, can be any type of devices the customer connects to the shared network via the customer STA (CPE node), either wired or wirelessly. As illustrated in FIG. 1, a first endpoint device 114 and a second endpoint device 116 are operatively coupled to the first customer STA 108 and a third endpoint device 118 and a fourth endpoint device 120 are operatively coupled to the second customer STA 110. For instance, a first customer may connect their endpoint device (e.g., mobile devices, set top box (STB) type devices like a FireTv device, or the like) and get internet access from the first customer STA 108, whereas a second customer may connect their endpoint devices and get internet access from the second customer STA 110. These devices are maintained by the shared wireless network 100 by way of the customer STAs and can consume content that may be cached locally within the shared wireless network 100.

The router device 106 includes a first storage device that stores a first mapping table. A first CPE node includes the first customer STA 108 and a set of one or more endpoint devices, such as illustrated with the first endpoint device 114 and the second endpoint device 116. The first customer STA 108 includes a second storage device that stores a second mapping table. A second CPE node includes the second customer STA 110 and a second set of one or more endpoint devices, such as illustrated with the third endpoint device 118 and the fourth endpoint device 120. The second customer STA 110 includes a third storage device that stores a third mapping table. During operation, the router device 106 connects to the ISP gateway device 112 as an ISP ingress (e.g., ISP server) of the ISP network 102. The router device 106 provides a first wireless service to the first customer STA 108 and the second customer STA 110. That is, the router device 106 is communicatively coupled to the first customer STA 108 via a first wireless communication link and the second customer STA 110 via a second wireless communication link. The first customer STA 108 provides a first access point (AP) functionality to the first set of endpoint device (e.g., 114, 116) in a first customer network 104(1). The second customer STA 110 provides a second AP functionality to the second set of endpoint device (e.g., 118, 120) in a second customer network 104(2). The router device 106 and the first customer STA 108 establish a first logical channel 122 for the first endpoint device 114 by i) mapping, in the first mapping table, a first public Internet Protocol (IP) address provided by the ISP gateway device 112 for the first endpoint device 114 to a first private IP address and ii) mapping, in the second mapping table, the first private IP address to a second private IP address. The first private IP address identifies the first customer STA 108 and the second private IP address identifies the first endpoint device 114.

Although not illustrated in FIG. 1, the router device 106 and the first customer STA 108 establish a second logical channel for the second endpoint device 116 by iii) mapping, in the first mapping table, a second public IP address provided by the ISP for the second endpoint device 116 to the first private IP address, and iv) mapping, in the third mapping table, the first private IP address to a third private IP address. The first private IP address identifies the first customer STA 108 and the third private IP address identifies the second endpoint device 116.

Although not illustrated in FIG. 1, the router device 106 and the second customer STA 110 establish a third logical channel for the third endpoint device 118 by iii) mapping, in the first mapping table, a third public IP address provided by the ISP for the third endpoint device 118 to a third private IP address, and iv) mapping, in the third mapping table, the third private IP address to a fourth private IP address. The third private IP address identifies the second customer STA 110 and the fourth private IP address identifies the fourth endpoint device 120. Similarly, the router device 106 and the second customer STA 110 can establish a fourth logical channel for the fourth endpoint device 120.

Once the first logical channel 122 is established, the router device 106 can receive a first data packet from the ISP gateway device 112. The first data packet is directed to the first public IP address. The router device 106 translates, using the first mapping table, the first public IP address to the first private IP address, the first private IP address identifying the first customer STA 108. The router device 106 sends the first data packet to the first customer STA 108 based on the first private IP address. The first customer STA 108 receives the first data packet and translates, using the second mapping table, the first private IP address to the second private IP address and sends the first data packet to the first endpoint device 114 based on the second private IP address. Also, once the first logical channel 122 is established, the first customer STA 108 can receive a first data packet from the first endpoint device 114. The first data packet includes the second private IP address as a source address and a third public IP address as a destination address. The third public IP address is assigned by the ISP gateway device 112. The first customer STA 108 translates, using the second mapping table, the second private IP address to the first private IP address and sends the first data packet to the router device 106 based on the first private IP address. The router device 106 receives the first data packet and translates, using the first mapping table, the first private IP address to the first public IP address and sends the first data packet to the ISP gateway device 112. The first data packet includes the first public IP address as the source address.

In contrast, in a shared wireless network without the logical channels, the CPEs and VNO routers all perform NAPT (Network Address Port Translation). In this scheme, all customer devices connected to the same CPE share the same IP address. The CPE differentiates connections originating from or destined to different customer devices by translating the source and destination ports so that they are guaranteed to be unique. The VNO router does this for connections originating from or destined to different CPEs. The VNO network collects and maintains sufficient information to distinguish connections originating from or destined to any device within the VNO network or downstream from it. The challenge with the current implementation comes into play when providing information about the individual connections that involve each VNO or customer device. The ISP must be able to tell the source and destination for each connection it provides. In order for this to work, the VNO must correlate data collected by each VNO device, determine the source and destination for each connection, and provide this data to the ISP. This approach is highly dependent on the reliability of the data coming from each VNO device and the synchronization of all the data emanating from all the VNO devices. These aspects complicate the NAPT approach since VNO devices may not always be synchronized and the data flow from these devices could be sporadic. In addition, this approach increases the need for cloud processing and storage since all data coming from the VNO devices must be stored and processed in the cloud, resulting in increased costs and complexity.

Aspects of the present disclosure provide a new approach that is based on providing a logical channel for each customer device using translation rules in a shared network. Aspects of the present disclosure can uses sub-interfaces (also referred to as virtual interfaces) and SNAT/DNAT rules to establish the logical channels. Although this approach is described with respect to a VNO network, the approach is applicable to any shared network where a logical channel between a root node and every other nodes is implemented. Aspects of the present disclosure provide a simple, scalable, and distributed approach that does not require a central controller to elaborately coordinate the implementation or maintenance of the logical channels. The approach requires minimal or no cloud involvement and investment, minimal data collection by the VNO, and with no correlation processing. Aspects of the present disclosure can be built on top of simple rules that can be managed by the existing VNO network devices without introducing additional CPU or memory usage. This approach can drastically reduce the cost for cloud involvement. In this approach, the VNO router associates every customer device with a unique IP address provided by the ISP. The VNO can simply provide a look up table containing IP addresses matched with the customer identifiers (IDs) to the ISP so that the ISP can record connections for each IP address and store them for a given customer ID. This way, the involvement of the VNO is reduced to only the implementation and maintenance of a logical channel for each customer. Once the logical channels are implemented and the look up table is provided to the ISP, the ISP can record connections on a per-customer basis. In addition, it can collect per-customer statistics which can be used to bill customers individually.

As described above, each logical channel is implemented in three steps on each VNO device (e.g., 106, 108, 110), including 1) the creation of a sub-interface on the WAN interface of the VNO device; 2) the addition of an SNAT rule; and 3) the addition of a DNAT rule.

As illustrated, each device is assigned a unique ID shown in brackets. For example, the customer ID, [VNO1], is assigned to the router device 106, [VNO1,1] to the first customer STA 108, [VNO1,2] to the second customer STA 110, [Cust1,1,1] to the first endpoint device 114, [Cust1,1,2] to the second endpoint device 116, [Cust1,2,1] to the third endpoint device 118, and [Cust1,2,2] to the fourth endpoint device 120. IP addresses for the corresponding local networks (VNO network or customer network) are shown next to the links between devices. The router device 106 is given 100.1.0.1 by the ISP gateway device 112. This IP address would be shared by all VNO devices and customer devices in the NAPT approach, but in this case, each device can have its own ISP-provided IP address. Only one logical channel is shown for the first endpoint device 114, [Cust1,1,1] with the ISP-provided IP address 100.1.0.111. Other logical channels are omitted in FIG. 1.

In one embodiment, VNO network IP addresses for each customer device can be algorithmically derived so that all devices in the network have a unique VNO network IP address. The VNO network IP addresses are private address. For example, the VNO router, router device 106, is assigned 10.1.0.1, the first customer STA 108 is assigned 10.1.0.11, and the second customer STA 110 is assigned 10.1.0.12. The first customer STA 108 can reserve the IP address 10.2.0.111 for the first endpoint device 114, [Cust1,1,1]. The first customer STA 108 can reserve 10.2.0.112 for the second endpoint device 116. Similarly, the second customer STA 110 can reserve 10.2.0.121 and 10.2.0.122 for the third endpoint devices 118 and the fourth endpoint device 120, respectively. Another possibility for the private IP address of the first endpoint device 114 could reserve 10.2.0.111 for the first endpoint device 114, and 10.20.112, 10.2.0.121, and 10.2.0.122 for the other endpoint devices.

On the first customer STA 108 (e.g., VNO1,1), two sub-interfaces WAN:111 and WAN:112 are added for Cust1, 1,1, and Cust1,1,2. The VNO network IP address 172.16.0.111 and 172.16.0.112 are assigned to these sub-interfaces. This way, the VNO1,1 can respond to Address Resolution Protocol (ARP) queries for 10.2.0.111 and 10.2.0.112, and VNO1,1 can accept packets with these destination addresses. This process can be repeated with corresponding IP addresses for the second customer STA 110, VNO1,2.

Next, on device VNO1,1 an SNAT rule can be added between 172.16.0.111 and 10.2.0.111. With this rule, when a packet comes from Cust1,1,1 to VNO1,1, its source IP address will be translated from 172.16.0.111 to 10.2.0.111 before being routed to VNO1. We repeat this with corresponding IP addresses for Cust1,1,2, Cust1,2,1, and Cust1,2,2.

Next, on device VNO1,1 a DNAT rule can be added between 10.2.0.111 and 172.16.0.111. With this rule, when a packet comes from VNO1 to VNO1,1 with destination address 10.2.0.111, the destination address will be translated to 172.16.0.111 before the packet is routed to Cust1,1,1. We repeat this with corresponding IP addresses for Cust1,1,2, Cust1,2,1, and Cust1,2,2.

At this point, all CPEs are ready and each customer device has a unique VNO network IP address in the 10.2.0.0/16 range and each VNO device already has a VNO network IP address in the 10.1.0.0/16 range. Therefore, from the perspective of VNO1, all devices have unique IP addresses. Now these three rules can be added on VNO1 for each device southbound from it. Suppose the ISP allocates 100.1.0.111 for Cust1,1,1. The following can be performed: add sub-interface WAN:111 with ISP-provided IP address 100.1.0.111; add an SNAT rule between 10.2.0.111 and 100.1.0.111 so that when a packet arrives with source address 10.2.0.111, it gets translated to 100.1.0.111; and add a DNAT rule between 100.1.0.111 and 10.2.0.111 so that when a packet arrives with destination address 100.1.0.111, it gets translated to 10.2.0.111.

This is repeated for all other customer devices and CPEs. In the end, a look up table is generated by the router device 106 and provided to the ISP via the ISP gateway device 112. Table 1 illustrates an example lookup table that is generated and provided to the ISP.

TABLE 1

| ISP-provided IP address | Device ID |
| --- | --- |
| 100.1.0.1 | VNO1 |
| 100.1.0.11 | VNO1,1 |
| 100.1.0.12 | VNO1,2 |
| 100.1.0.111 | Cust1,1,1 |
| 100.1.0.112 | Cust1,1,2 |
| 100.1.0.121 | Cust1,2,1 |
| 100.1.0.122 | Cust1,2,2 |

Using the lookup table, the ISP can record connections with these addresses as the source or destination IP address, and log it against the corresponding unique device ID. If only customer devices are required to have unique IP addresses, but not the VNO-managed nodes (e.g., 106, 108, 110), then these rules are added for customer devices only and. VNO1, VNO1,1, and VNO1,2 devices share 100.1.0.1 using NAPT.

The proposed solution is flexible in that if the VNO and ISP agree that all customer devices under a CPE can share the same IP address, the SNAT/DNAT rules can be removed and the sub-interface on CPE. In this special case of the solution given above, CPEs would perform NAPT and the VNO router would still perform SNAT/DNAT. Each CPE would still have a unique ISP-provided IP address that can be used for data or stats collection and billing.

The proposed solution, as described herein, is very simple, scalable, and distributed in nature. There is no need for elaborate coordination and distribution of state across the network nodes, which typically adds undesired complexity. Every node applies changes given above in steps 1-3 on itself. Every node can algorithmically derives the VNO network address in 10.2.0.0/16 for each customer device.

It should be noted that various mechanisms and practices are followed in the industry: use of VLAN tagging (layer 2 mechanism), MPLS tagging (layer 2.5 mechanism), IP-in-IP or Generic Routing Encapsulation (GRE) tunneling (layer 3+ mechanism), or Transport Layer Security (TLS) sessions (layer 4+ mechanism). All the aforementioned schemes require an elaborate control mechanism for flow/logical channel setup and tear-down with the distribution of labels/tags to all the nodes along the path of the flow. This requirement adds increased complexity, and coordination in the control plane which the proposed scheme totally circumvents. Data-plane programming and support in the proposed solution and in light-weight tagging solutions (layer 3 and below) are comparable in complexity and packet processing. Although, the focus of this proposal is on IPDR support, other regulatory requirements like net-neutrality, and per-customer bandwidth limits or caps can be easily be accommodated.

The shared wireless network 100 can be logically organized into the following hierarchical units: cells, nodes, and devices according to one embodiment. A "cell unit" is a collection of wired connections and wireless connections arranged in a cellular structure. It should be noted that cell unit is not a cell of a cellular wireless network. The cell unit is made up of smaller cell units, called pico-cell units, nano-cell units, and micro-cell units. As described herein, a pico-cell unit is a cell unit that includes customer premise equipment at customer premises (e.g., buildings, houses, or the like). The pico-cell unit is served by gateway devices from a single base station node or a relay node. A nano-cell unit is a cell unit that includes one or more pico-cell units. The nano-cell unit is served by base station devices from a single base station node. A micro-cell unit is a cell unit that includes one or more nano-cell units. The nano-cell units of the micro-cell are is connected via a wireless network.

A "node" is a logical network building block that is sub-divided into "infrastructure" (e.g., base station nodes, relay nodes, or the like) and "customer premises equipment (CPE)." The shared wireless network 100 can include the following "nodes:" a base station node (BSN), a relay node (RLN), a storage (NAS) node), and a CPE node (also referred to as a home access node (HAN). A BSN connects to the ISP server via a router device, provides a first coverage (e.g., BS coverage) to the RLN, and provides a second coverage (e.g., gateway coverage) to a first CPE node, such as CPE node. The RLN connects to the BSN through a relay device and provides a third coverage (e.g., gateway coverage) to a second CPE node (not illustrated in FIG. 1). The CPE node can include one or more customer stations that provide one or more access points for one or more endpoint devices at the customer premises. The first coverage can be a first wireless service the second coverage can be a second wireless service, and the third coverage can be a third wireless service.

The BSN, the RLN, and the CPE node can be organized logically in a cascaded star topology. In the cascaded star topology, the BSN can be a first-tier hub with respect to the RLN and the first CPE node. In addition, in the cascaded star topology, the RLN can be a second-tier hub with respect to the second CPE node. It should be noted that the RLN could be considered a third-tier hub if there were an intervening RLN between RLN and the BSN. That is, the RLN can establish another wireless link between one or more RLNs back to the BSN. The cascaded star topology is a configuration of a star network that can use hubs on spokes of the star network to expand or cascade the network into additional star networks. Alternatively, the BSN, the RLN, and the CPE node(s) can be organized in other multi-star networks or other chained interface configurations.

The network architecture of the wireless network 100 is itself device agnostic, although various embodiments described herein can utilize wireless network devices that are each manufactured as a common device type (e.g., single SKU product) and programmed to operate as a "device role." A "device role" is a set of specific network functions associated with one or more network devices, such as a primary wireless network device (also referred to herein as "wireless device," "network device," or "D2") that is configured according to a device role (e.g., a gateway device, a customer station, or the like). For example, a wireless device that is configured according to the gateway role operates as a gateway (GW). In various embodiments, the common device type can be programmed to operate according to one of the following device roles: a router (RT) role, a base station (BS) role, a relay (RL) role, a gateway (GW) role, a customer station (STA) role, or a storage (NAS) role. It should be noted that the nodes of the wireless network 100 are logically organized, whereas the devices of a particular node are physically organized at a location of a customer premise, such as a single dwelling unit (SDU), a multi-dwelling unit (MDU), or at other buildings or structures.

The BSN can include a network switch and multiple wireless devices of the common device type. The multiple wireless devices of the BSN can include a base station device, a gateway device, and a storage device. The base station device is a wireless network device that is programmed to operate as the BS. The gateway device is a wireless network device that is programmed to operate according to the GW role. The storage device is a wireless network device that includes one or more attached storage mediums, such as USB connected storage media (e.g., HDD, SSD, or the like), is programmed to operate according to the NAS role. That is, the storage device can be programmed to operate as a storage controller to the attached storage mediums.

The RLN can include a network switch and multiple wireless devices of the common device type. The multiple wireless devices of the RLN can include a relay device, a gateway device, and an optional storage device. The relay device is a wireless network device that is programmed to operate as the RL. The gateway device is a wireless network device that is programmed to operate as the GW. The optional storage device is a wireless network device that includes one or more attached storage mediums, such as USB connected storage media (e.g., HDD, SSD, or the like), is programmed to operate as the NAS. That is, the optional storage device can be programmed to operate as a storage controller to the attached storage mediums. By using common device types for these devices, flexible multi-use capability across the wireless network 100 can be achieved with relatively low cost and ease of software development. It should also be noted that the common device type can be used for a router device, as well as the content storage functions. Alternatively, other types of devices can be used for the routing and storage functions of the wireless network 100.

The CPE node can include one or more devices (referred to herein as customer premises equipment), including one or more customer stations and one or more endpoint devices. For example, the customer station can be the wireless network device that is manufactured according to the common device type and programmed to operate as the customer STA. The one or more endpoint devices can be various types of wireless devices, such as mobile devices, smart TVs, TV dongles, watches, IoT devices, thermostats, home automation equipment, laptops, computers, entertainment consoles, gaming consoles, voice-controlled devices, or the like.

In one embodiment, the base station device (i.e., BS role) can use one or more radios to provide a first multi-sector, point-to-multi-point (PtMP) coverage to one or more relay devices up to a first distance, the first distance being approximately 100 meters, for example. The base station device can use the one or more radios to provide the first wireless service to the relay node and any other relay nodes that are located within the first distance from the base station device The relay device can use one or more radios to provide a single sector, point-to-point (PtP) connectivity to the base station device up to a second distance, the second distance being approximately 100 meters, for example. The relay device can use the one or more radios to connect with the base station device via the first wireless service and provide the third wireless service to the first CPE node and any other CPE nodes that are located within the second distance from the relay device. A first gateway device (at the BSN) can use one or more radios to provide a second multi-sector, PtMP coverage to one or more customer stations up to a third distance, the third distance being approximately 30 meters, for example. The first gateway device can use the one or more radios to provide the second wireless service to the second CPE node and any other CPE nodes that are located within the third distance from the first gateway device. A second gateway device (at the RLN) can use one or more radios to provide a third multi-sector, PtMP coverage to one or more additional customer stations up to a fourth distance, the fourth distance being approximately 30 meters, for example. The second gateway device can use the one or more radios to provide the third wireless service to the first CPE node and any other CPE nodes that are located within a fourth distance from the second gateway device. As noted above, one or more external storage mediums (at the BSN) can be coupled to the storage device and the storage device operates as a first storage controller to the one or more external storage mediums. Similarly, one or more additional external storage mediums are coupled to the optional storage device at the RLN and the second storage device operates as a second storage controller to the one or more external storage mediums.

As described herein, the wireless network 100 is scalable according to the defined cell units, nodes, and device roles. In one embodiment, the wireless network 100 can include: a first pico-cell unit that includes a first dwelling unit served by the gateway device of the BSN; a second pico-cell unit that includes a second dwelling unit served by the gateway device of the RLN; a first nano-cell unit that includes the first pico-cell unit and the second pico-cell unit, which are both served by the base station device of the BSN. The wireless network 100 can further include a second nano-cell unit that is coupled to the first nano-cell unit via a link. The second nano-cell unit can include at least a third pico-cell unit having a third dwelling unit served by a third gateway device of a second base station node. The wireless network 100 further includes a micro-cell unit that includes the first nano-cell unit and the second nano-cell unit.

Figure 2:
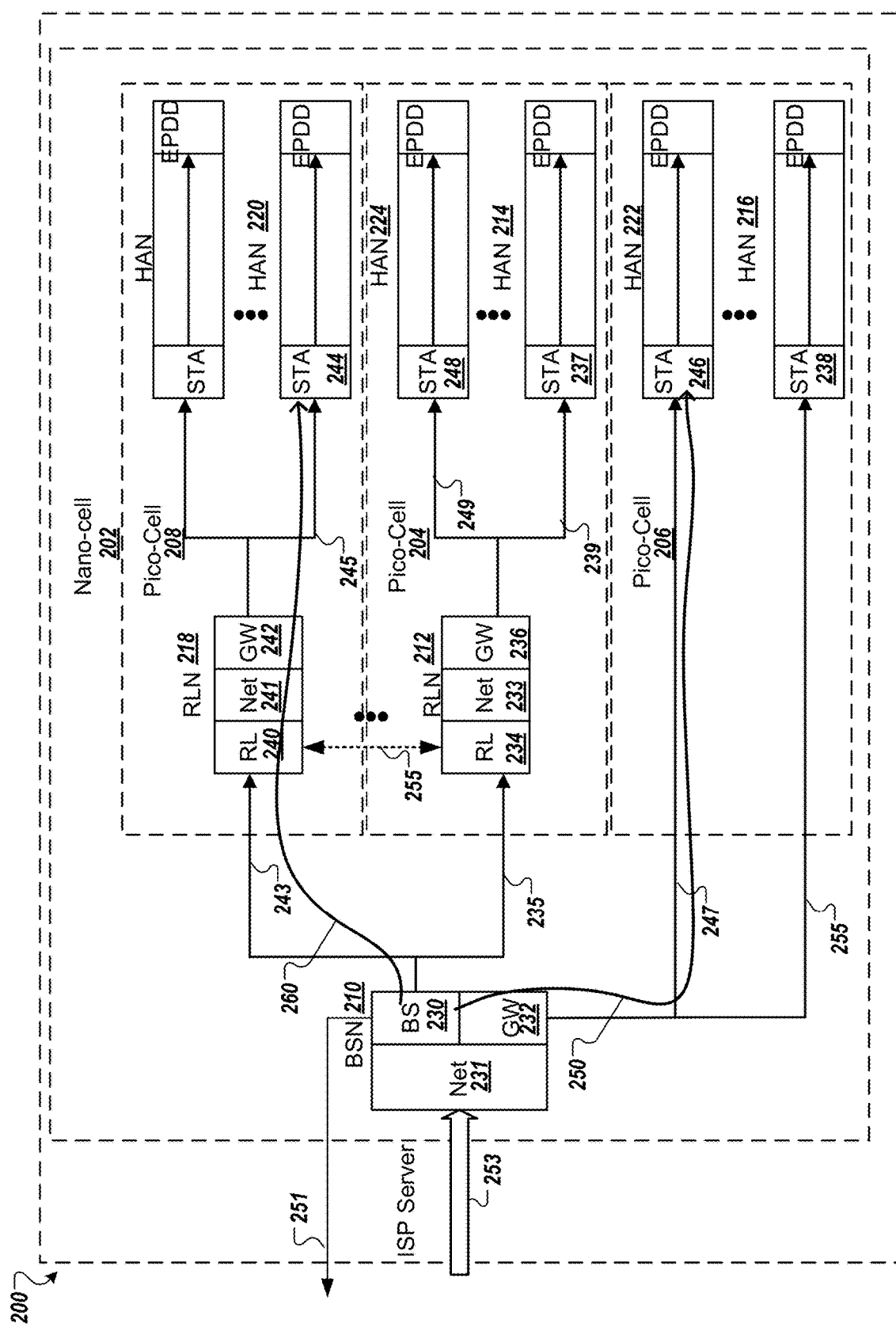
FIG. 2 is a network diagram of a portion of a wireless network that is logically organized into the following hierarchical units: cells, nodes, and devices and includes logical channels per customer device according to one embodiment.

FIG. 2 is a network diagram of a portion of a wireless network 200 that is logically organized into the following hierarchical units: cells, nodes, and devices and includes logical channels per customer device according to one embodiment. The portion of the wireless network 200 includes a first nano-cell unit 202, having a first pico-cell unit 204, a second pico-cell unit 206, and a third pico-cell unit 208. The first nano-cell unit 202 includes a BSN 210, a first RLN 212, a second RLN 218, and multiple HANs. The BSN 210 is a first-tier hub of a cascaded star topology. The BSN 210 can operate in a similar manner as the router device 106 in establishing a first logical channel 250 between the BSN 210 and any of the customer STAs 238, 246, directly via a gateway device 232 or establishing a second logical channel 260 between the BSN 210 and any of the customer STAs 237, 244, 248, or others, through one of the RLNs 212, 218. The BSN 210 includes a base station device 230, a gateway device 232, and a first network switch 231 coupled between the base station device 230 and the gateway device 232. The base station device 230, the gateway device 232, and the first network switch 231 are physically organized at a same location, such as on a first dwelling unit. The first RLN 212 is a second-tier hub of the cascaded star topology. The first RLN 212 includes a relay device 234, a gateway device 236, and a second network switch 233 coupled between the relay device 234 and the gateway device 236. The first RLN 212 is part of the first pico-cell unit 204. The relay device 234, gateway device 236, and second network switch 233 are physically organized at a same location, such as on a second dwelling unit. The first RLN 212 is part of the first pico-cell unit 204, whereas the BSN 210 is part of the second pico-cell unit 206. In addition, the first pico-cell unit 204 includes HAN 214 (also referred to as CPE node) and the second pico-cell unit 206 includes HAN 216. The HAN 214 includes a customer station 237. The HAN 214 is a first client of the second-tier hub (e.g., first RLN 212). The HAN 216 includes a customer station 238. The HAN 216 is a first client of the first-tier hub (e.g., BSN 210), whereas the first RLN 212 is a second client of the first-tier hub). In one embodiment, the base station device 230, the gateway device 232, the relay device 234, the gateway device 236, the customer station 237, and the customer station 238 are manufactured as a common device type. The base station device 230 is configured to operate as a BS and communicate with (e.g., send data to and receive data from) the relay device 234 over a first wireless link 235. The gateway device 232 is configured to operate as a GW and communicate with the customer station 238 over a second wireless link 255. The relay device 234 is configured to operate as a RL and communicate with the base station device 230 over the first wireless link 235. The gateway device 236 is configured to operate as the GW and communicate with the customer station 237 over a third wireless link 239. The customer station 237 is configured to operate as a customer STA and communicate with the gateway device 236 over the third wireless link 239. The customer station 238 is configured to operate as the customer STA and communicate with gateway device 232 over the second wireless link 255.

The second RLN 218 includes a relay device 240, a gateway device 242, and a third network switch 241 coupled between the relay device 240 and the gateway device 242. The second RLN 218 can be another second-tier hub of the cascaded star topology and the second RLN 218 can be a third client of the first-tier hub (e.g., BSN 210). HAN 220 includes a customer station 244. The HAN 220 is a first client of the other second-tier hub (e.g., second RLN 218). The second RLN 218 is a third client of the first-tier hub (e.g., BSN 210). In one embodiment, the relay device 240, the gateway device 242, and the customer station 244 are manufactured as the common device type (i.e., include the identical hardware). The relay device 240 is configured to operate as the relay and communicate with the base station device 230 over a fourth wireless link 243. The gateway device 242 is configured to operate as the GW and communicate with the customer station 244 over a fifth wireless link 245. The customer station 244 is configured to operate as the customer STA and communicate with the gateway device 242 over the fifth wireless link 245.

It should be noted that the second RLN 218 could be considered a second-tier hub if there were an intervening RLN between second RLN 218 and the BSN 210. That is, the second RLN 218 can establish another wireless link between one or more RLNs back to the BSN 210. For example, the second RLN 218 can establish a wireless link 255 with the first RLN 212 to connect to the BSN 210, instead of over the fourth wireless link 243. Also, the second RLN 218 (or the first RLN 212) can be third-tier hubs if there were more than one intervening RLNs between the respective RLN and the BSN 210.

As illustrated in FIG. 2, the BSN 210 and the HAN 216 are physically organized as part of the second pico-cell unit 206 and the first RLN 212, the HAN 214 are physically organized as part of the first pico-cell unit 204, and the second RLN 218 and the HAN 220 are physically organized as part of the third pico-cell unit 208. The first pico-cell unit 204, the second pico-cell unit 206, and the third pico-cell unit 208 are physically organized as part of the first nano-cell unit 202. The pico-cell units can include additional HANs. For example, the second pico-cell unit 206 includes HAN 222, which includes a customer station 246. The customer station 246 is a fourth client of the first-tier hub. The customer station 246 can be manufactured as the common device type and be configured to operate as the customer STA role and communicate with the gateway device 232 over a sixth wireless link 247. For another example, the first pico-cell unit 204 includes HAN 224, which includes a customer station 248. The customer station 248 is a second client of the second-tier hub (e.g., first RLN 212). The customer station 248 can be manufactured as the common device type and can be configured to operate as the customer STA role and communicate with the gateway device 236 over a seventh wireless link 249. Similarly, the third pico-cell unit 208 can include an additional HAN as additional clients of the second RLN 218.

Although not illustrated in FIG. 2, the wireless network 200 can include a ninth node with a twelfth device, a thirteenth device, and a fourth network switch coupled between the twelfth device and the thirteenth device. The ninth node can be another first-tier hub of the cascaded star topology. The twelfth device and the thirteenth device can be manufactured as the common device type. The twelfth device can be configured to operate as the BS and communicate with the base station device 230 over a wired or wireless link 251. In addition, the twelfth device can be configured to communicate with one or more additional RLNs over one or more wireless links. The thirteenth device can be configured to operate as the GW and communicate with one or more customer stations over an additional wireless link. The ninth node, the one or more additional RLNs, and one or more customer station can be part of a second nano-cell unit (not illustrated in FIG. 2) that is coupled to the first nano-cell unit 202 via the wireless link 251. The second nano-cell unit and the first nano-cell unit 202 can be physically organized as part of a micro-cell unit. The base station device 230 is also configured to connect to an Internet Service Provider (ISP) server 253 via a router device (not illustrated in FIG. 2). The router device can be located at the same location as the BSN 210 and can be considered part of the BSN 210. The router device can connect to the base station device 230 via the first network switch 231. Alternatively, the base station device 230 can be connected to the router device in other manners and the router device can be located at a different location than the BSN 210.

In one embodiment, all devices of the first pico-cell unit 204 can be disposed on or within a first multi-dwelling unit (MDU) and all devices of the second pico-cell unit 206 are disposed on or within a second MDU. Similarly, all devices of the third pico-cell unit 208 can be disposed on or within a third MDU. The first nano-cell unit 202 can include seven MDUs, including the first MDU, the second MDU, and the third MDU. Each pico-cell unit of the first nano-cell unit 202 can service multiple customers (e.g., 28 customers) of a single building (e.g., 10-floor building). The first nano-cell unit 202 can service various customers at multiple customer premises with multiple MDUs, for example, approximately 196 customers within 7 buildings within a 100 m radius. It should be noted that other embodiments, more or less than seven MDUs can be used. However, seven buildings per MDU-based nano-cell unit can support 200-300 customers within 600 Mbps capacity and 100 m radius, depending on service type (VoD, ISP) and contention ratios.

In another embodiment, all devices of the BSN 210 are disposed on a first structure and all devices of the HAN 216 are disposed on or within a first single dwelling unit (SDU). All devices of the HAN 222 can be disposed on or within a second SDU. The second pico-cell unit 206 can include multiple SDUs within a specified radius (e.g., 75 m radius) to service multiple customers (e.g., 68 customers). The first nano-cell unit 202 can service various customers at multiple customer premises (SDUs), for example, approximately 476 customers within 7 buildings (SDU) within a 150 m radius. In one embodiment, the BSN 210 is disposed on a first structure that is higher than the SDUs, such as a tower or a building. The first RLN 212 can also be disposed on a second structure that is higher than surrounding SDUs. Similarly, the second RLN 218 can be disposed on a third structure that is higher than surrounding SDUs. Alternatively, the RLNs can be disposed on one of the SDUs and serve surrounding HANs on the respective SDUs.

In another embodiment, the first device, the second device, and the first network switch of the first node are disposed on a roof of a first building and the sixth device of the fourth node is disposed on or within a first SDU that is in proximity to the first building. The third device, the fourth device, and the second network switch of the second node are disposed on a roof of a second building and the fifth device of the third node is disposed on or within a second SDU that is in proximity to the second building. The twelfth device, the thirteenth device, and the fourth network switch of the ninth node are disposed on a roof of a third building. In one embodiment, the first nano-cell unit includes the first building and the second building and the first pico-cell unit includes a first set of SDUs, including the first SDU, the first set of SDUs being in proximity to the first building. The second pico-cell unit includes a second set of SDUs, including the second SDU, the second set of SDUs being in proximity to the second building.

In another embodiment, the first device, the second device, and the first network switch of the first node are disposed on a roof of a first building and the sixth device of the fourth node is disposed on or within a second building that is in proximity to the first building. The third device, the fourth device, and the second network switch of the second node are disposed on a roof of a third building and the fifth device of the third node is disposed on or within a fourth building that is in proximity to the third building. The twelfth device, the thirteenth device, and the fourth network switch of the ninth node are disposed on a roof of a fourth building. In one embodiment, the first nano-cell unit includes the first building and the third building and the first pico-cell unit includes a first set of buildings, including the second building, the first set of buildings being in proximity to the first building. The second pico-cell unit includes a second set of buildings, including the fourth building, the second set of buildings being in proximity to the fourth building. Additional details regarding the MDUs and SDUs are set forth below with respect to FIGS. 3-5.

Figure 3:
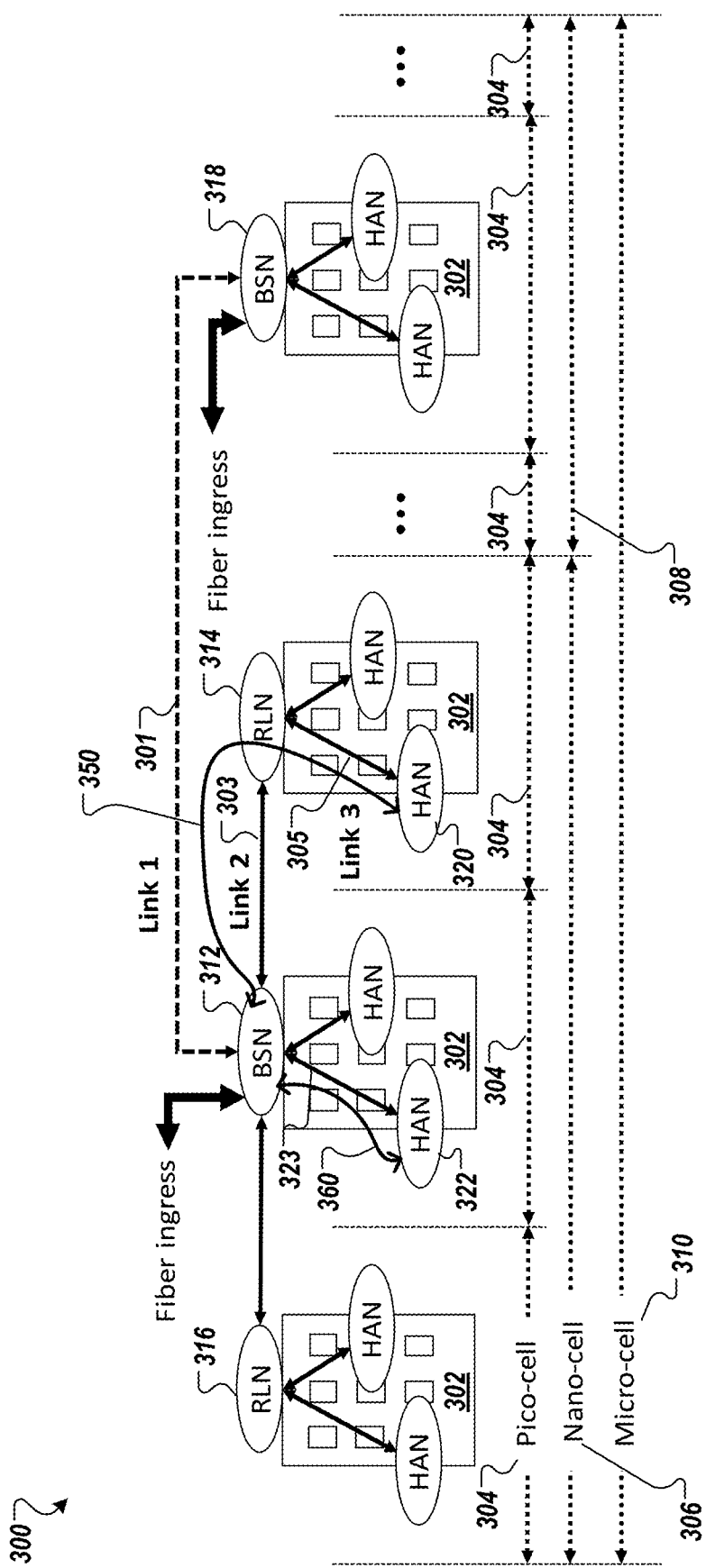
FIG. 3 is a network diagram of a portion of a wireless network with multi-dwelling units (MDUs) as a first housing society type and multiple logical channels per customer device according to one embodiment.

FIG. 3 is a network diagram of a portion of a wireless network 300 with multi-dwelling units (MDUs) 302 as a first housing society type and multiple logical channels per customer device according to one embodiment. Each MDU can include four or more dwellings per building. Each MDU 302 can be part of a single pico-cell unit 304. Some of the MDUs 302 can be part of a first nano-cell unit 306 and other MDUs 302 can be part of one or more additional nano-cell units 308 within a micro-cell unit 310, as described herein. A first BSN 312 is disposed on a first MDU, a first RLN 314 is disposed on a second MDU, and a second RLN 316 is disposed on a third MDU. A second BSN 318 can be disposed on another MDU in another nano-cell unit 308 within the micro-cell unit 310. The first BSN 312 is coupled to a fiber ingress of the ISP. The first BSN 312 is communicatively coupled to the second BSN 318 via a first link 301. The second BSN 318 can be coupled to another fiber ingress of the ISP. The first BSN 312 is communicatively coupled to the first RLN 314 via a second link 303. The first RLN 314 is communicatively coupled to a first HAN 320 via a third link 305. The first RLN 314 can be communicatively coupled to other HANs in the pico-cell unit 304. The first BSN 312 is also communicatively coupled to the second RLN 316 via a fourth link. The second RLN 316 is communicatively coupled to one or more HANs in the respective pico-cell unit 304.

In FIG. 3, the first BSN 312 can establish a first logical channel 350 between the first BSN 312 and the first HAN 320 over the second link 303 between the first BSN 312 and the first RLN 314 and the third link 305 between the first RLN 314 and the first HAN 320. The first BSN 312 can establish a second logical channel 360 between the first BSN 312 and a second HAN 322 over a link 323 between the first BSN 312 and the second HAN 322. The first BSN 312 can establish logical channels to each of the other HANs. Alternatively, a router device, not illustrated in FIG. 3, can establish the logical links through the first BSN 312.

Figure 4:
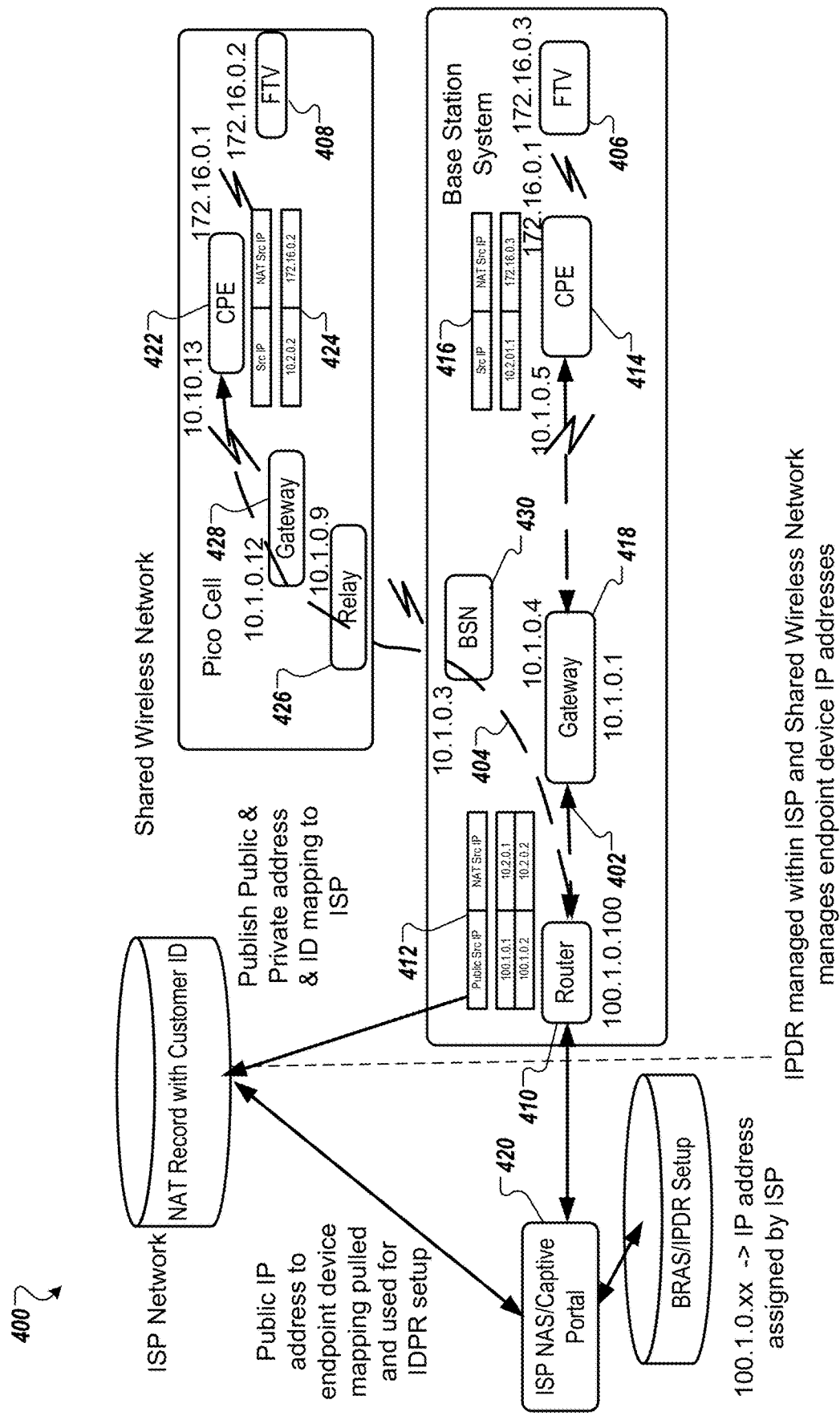
FIG. 4 is a network diagram illustrating two logical channels for two endpoint devices according to one embodiment.

FIG. 4 is a network diagram 400 illustrating two logical channels 402, 404 for two endpoint devices 406, 408 according to one embodiment. A first logical channel 402 is created between a router device 410 and the first endpoint device 406. The first logical channel 402 is established by a first mapping in a first mapping table 412, the first mapping including a first public IP address assigned to the first endpoint device 406 and a first private IP address that identifies a first CPE 414 and a second mapping in a second mapping table 416, the second mapping including the first private IP address and a second private IP address that identifies the first endpoint device 406. Any data packets received from an ISP server 420 by the router device 410 that are directed to the first public IP address of the first endpoint device 406 is translated to the first private IP address and sent to the first CPE 414 according to the first private IP address. The router device 410 sends the data packet with the translated address to the first CPE 414 via a gateway device 418. The first CPE 414 receives the data packet and translates the first private IP address to the second private IP address and sends the data packet to the first endpoint device 406. Similarly, any data packets originated from the first endpoint device 406 are sent to the first CPE 414 and the first CPE 414 translates the second private IP address to the first private IP address and sends the data packet to the router device 410 via the gateway device 418. The router device 410 translates the first private IP address to the first public IP address and sends the data packet to the ISP server 420.

A second logical channel 404 is created between the router device 410 and the second endpoint device 408. The second logical channel 404 is established by a third mapping in the first mapping table 412, the third mapping including a second public IP address assigned to the second endpoint device 408 and a third private IP address that identifies a second CPE 422 and a fourth mapping in a third mapping table 424, the fourth mapping including the third private IP address and a fourth private IP address that identifies the second endpoint device 408. Any data packets received from an ISP server 420 by the router device 410 that are directed to the second public IP address of the second endpoint device 408 is translated to the third private IP address and sent to the second CPE 422 according to the third private IP address. The router device 410 sends the data packet with the translated address to the second CPE 422 via a base station device 430, a relay device 426, and a gateway device 428. The second CPE 422 receives the data packet and translates the third private IP address to the fourth private IP address and sends the data packet to the second endpoint device 408. Similarly, any data packets originated from the second endpoint device 408 are sent to the second CPE 422 and the second CPE 422 translates the fourth private IP address to the third private IP address and sends the data packet to the router device 410 via the gateway device 428, the relay device 426, and the base station device 430. The router device 410 translates the third private IP address to the second public IP address and sends the data packet to the ISP server 420.

Figure 5:
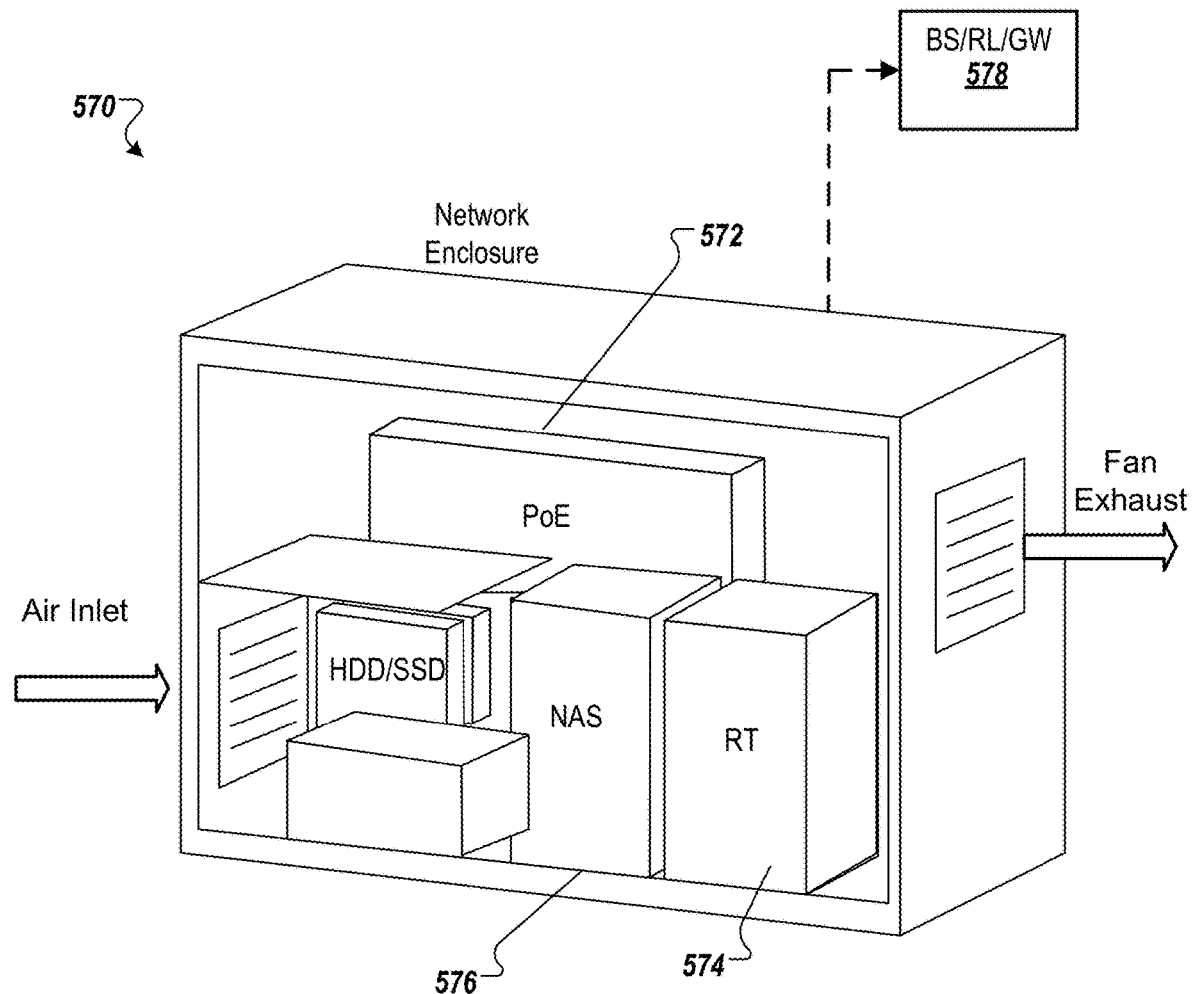
FIG. 5 illustrates a housing with a multiple devices of a base station node (BSN) according to one embodiment.

FIG. 5 illustrates a housing 570 with a multiple devices of a base station node (BSN) according to one embodiment. The housing 570 include a PoE network switch 572, a router device 574 (RT) that serves as ingress into a pico-cell unit, and a storage device 576 (NAS) coupled to one or more storage mediums (e.g., HDD, SSD). The PoE network switch 572 coupled the router device 574 and the storage device 576 to operate as the BSN. The router device 574 can provide layer 3 (L3) routing functions for communications within a nano-cell unit. The router device 574 can provide a network address translation (NAT) service for devices in the pico-cell unit. The router device 574 (or a separate device) can also be configured as a base station device that can provide a multi-sector, 360-degree PtMP coverage to relay devices up to 100 m range. The housing 570 can be disposed on a MDU or other structure, such as on a roof of a building. It should be noted that a RLN includes a similar housing with the PoE network switch, a relay device, a gateway device, and an optional storage device. The housing of the RLN can also be disposed on a separate MDU or other structure. In another embodiment, the router device 574 can be connected to one or more devices 578 via the PoE network switch 572. The one or more devices 578 can be a base station device, a relay device, a gateway device, or any combination thereof. The one or more devices 578 can be disposed on the same roof or a different roof than the housing 570. These one or more devices can also be disposed in a single or multiple housings or enclosures.

Figure 6A:
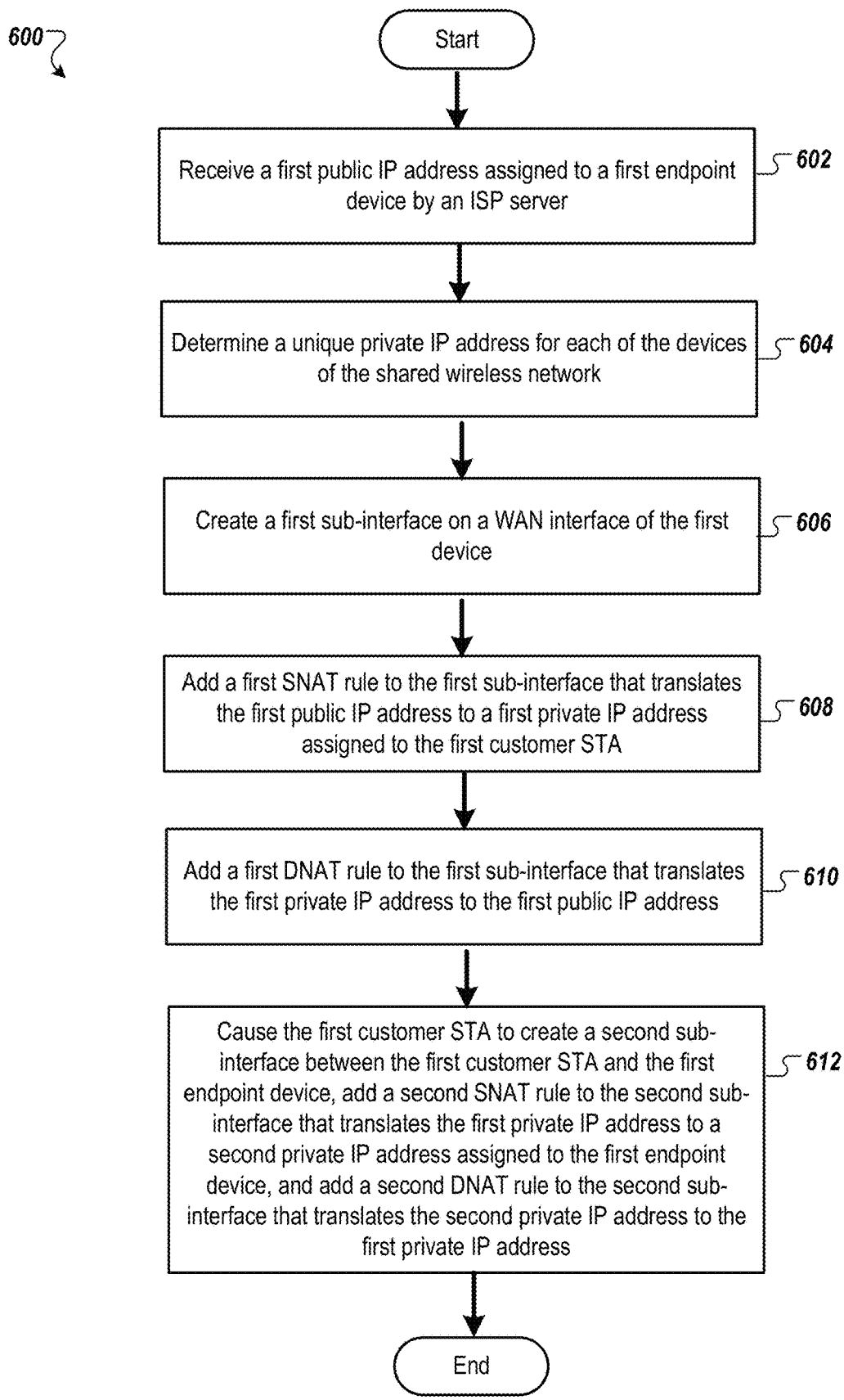
FIG. 6A is a flow diagram of a method of establishing a logical channel between a first device and an endpoint device in a shared wireless network according to one embodiment.

FIG. 6A is a flow diagram of a method 600 of establishing a logical channel between a first device and an endpoint device in a shared wireless network according to one embodiment. The method 600 may be performed by processing logic that comprises hardware (e.g., circuitry, dedicated logic, programmable logic, microcode, etc.), software, firmware, or a combination thereof. In one embodiment, the method 600 may be performed by any of the devices described herein and illustrated with respect to FIGS. 1-5.

Referring back to FIG. 6A, the method 600 begins by receiving a first public IP address assigned to a first endpoint device by an ISP server (block 602). The first public IP address can be provided by the ISP server or can be stored in a database that is accessible by the processing logic. The wireless network includes multiple endpoint devices and multiple customer STAs. The processing logic determines a unique private IP address for each of the devices of the shared wireless network (block 604). In one embodiment, the processing logic determines the unique private IP address for each of the devices by algorithmically deriving the unique private IP address. That is, each device in the wireless network can algorithmically derive the unique private IP addresses of any other device. The processing logic creates a first sub-interface on a WAN interface of the first device (block 606). The first device is communicatively coupled to a device of an Internet Service Provider (ISP) through the WAN interface. The first sub-interface communicatively couples the first device to a first customer STA. The processing logic adds a first SNAT rule to the first sub-interface that translates the first public IP address to a first private IP address assigned to the first customer STA (block 608). The processing logic adds a first DNAT rule to the first sub-interface that translates the first private IP address to the first public IP address (block 610). The processing logic causes the first customer STA to create a second sub-interface between the first customer STA and the first endpoint device, add a second SNAT rule to the second sub-interface that translates the first private IP address to a second private IP address assigned to the first endpoint device, and add a second DNAT rule to the second sub-interface that translates the second private IP address to the first private IP address (block 612); and the method 600 ends. The method 600 can be repeated for each device of the shared wireless network.

Once all the sub-interfaces and SNAT rules and DNAT rules have been added, the processing logic can generate and send a table that includes the public IP address and a DEVI ID for each of the endpoint devices in the shared wireless network.

In one embodiment, the processing logic receives a second public IP address assigned to a second endpoint device by the ISP gateway (also referred to as ISP ingress, ISP server, or gateway device. The processing logic creates a third sub-interface on the WAN interface of the first device. The third sub-interface communicatively couples the first device to the first customer STA as well, but for communicating with a second customer STA. The processing logic adds a third SNAT rule to the third sub-interface that translates the second public IP address to the first private IP address assigned to the first customer STA. The processing logic adds a third DNAT rule to the third sub-interface that translates the first private IP address to the second public IP address. The processing logic causes the first customer STA to create a fourth sub-interface between the first customer STA and the second endpoint device, add a fourth SNAT rule to the fourth sub-interface that translates the first private IP address to a fourth private IP address assigned to the second endpoint device, and add a fourth DNAT rule to the fourth sub-interface that translates the fourth private IP address to the first private IP address. This can be done to establish a second logical channel between the processing logic and the second endpoint device that is separate from the first logical channel established between the processing logic and the first endpoint device. In a further embodiment, the processing logic sending, by the first device, a table including: i) the first public IP address and a first device ID that identifies the first endpoint device; and ii) the second public IP address and a second device ID that identifies the second endpoint device. The table can be used by the ISP gateway to collect network usage and activities on a per-customer basis.

In another embodiment, the processing logic receives a second public IP address assigned to a second endpoint device by the ISP gateway. The processing logic creates a third sub-interface on the WAN interface of the first device. The third sub-interface communicatively couples the first device to a second customer STA. The processing logic adds a third SNAT rule to the third sub-interface that translates the second public IP address to a third private IP address assigned to the second customer STA first private IP address assigned to the first customer STA. The processing logic adds a third DNAT rule to the third sub-interface that translates the third private IP address to the second public IP address. The processing logic causes the second customer STA to create a fourth sub-interface between the second customer STA and the second endpoint device, add a fourth SNAT rule to the fourth sub-interface that translates the third private IP address to a fourth private IP address assigned to the second endpoint device, and add a fourth DNAT rule to the fourth sub-interface that translates the fourth private IP address to the third private IP address. In a further embodiment, the processing logic sends a table including: i) the first public IP address and a first device identifier (ID) that identifies the first endpoint device; and ii) the second public IP address and a second device ID that identifies the second endpoint device. The table can be used by the ISP gateway to collect and correlate network usage and activities on a per-customer basis.

In another embodiment, the processing logic can route incoming data packets and outgoing packets according to the sub-interfaces and SNAT and DNAT rules. In one embodiment, the processing logic receives a first data packet from the gateway device, the first data packet being directed to the first public IP address. The processing logic translates the first public IP address to the first private IP address using the first SNAT rule. The processing logic routes the first data packet to the first customer STA based on the first private IP address, the first customer STA to translate the first private IP address to the second private IP address using the second SNAT rule and route the first data packet to the first endpoint device.

In another embodiment, the processing logic receives a first data packet from the first customer STA, the first data packet including the first private IP address. The first customer STA receives the first data packet from the first endpoint device and translates the second private IP address to the first private IP address using the second DNAT rule. The processing logic translates the first private IP address to the first public IP address using the first DNAT rule. The processing logic sends the first data packet to the gateway device.

In another embodiment, the processing logic establishes a first logical channel between the processing logic and the first endpoint device by i) mapping, in a first mapping table stored by the first device, the first public IP address to the first private IP address, the first private IP address identifying the first customer STA and ii) mapping, in a second mapping table stored by the first customer STA, the first private IP address to the second private IP address, the second private IP address identifying the first endpoint device. The first logical channel includes the first sub-interface and the second sub-interface. In a further embodiment, the processing logic establishes a second logical channel between the second endpoint device and the processing logic by i) mapping, in the first mapping table stored by the first device, a second public IP address, assigned to the second endpoint device by the ISP, to a third private IP address, the third private IP address identifying the second customer STA and ii) mapping, in a third mapping table stored by the second customer STA, the third private IP address to a fourth private IP address, the fourth private IP address identifying the second endpoint device. The second logical channel includes a third sub-interface between the first device and the second customer STA and a fourth sub-interface between the second customer STA and the second endpoint device.

In another embodiment, the processing logic receives a public IP address assigned to a first endpoint device by an ISP gateway. The public IP address is associated with the first endpoint device that is part of a shared wireless network. The processing logic establishes a logical channel for the first endpoint device through one or more devices of the shared wireless network. The logical channel defines a routing relationship between the public IP address and a private IP address for the endpoint device within the wireless network. The processing logic generates a first mapping table that maps the public IP address to a first private IP address for a customer STA. The processing logic generates a second mapping table that maps the first private IP address to a second private IP address, the second IP address identifying the first endpoint device. Similarly, the first mapping table can map a second public IP address to a third private IP address for a second customer STA and a third mapping table can map the third private IP address to a fourth private IP address, the fourth private IP address identifying the second endpoint device that is associated with the second public IP address.

Figure 6B:
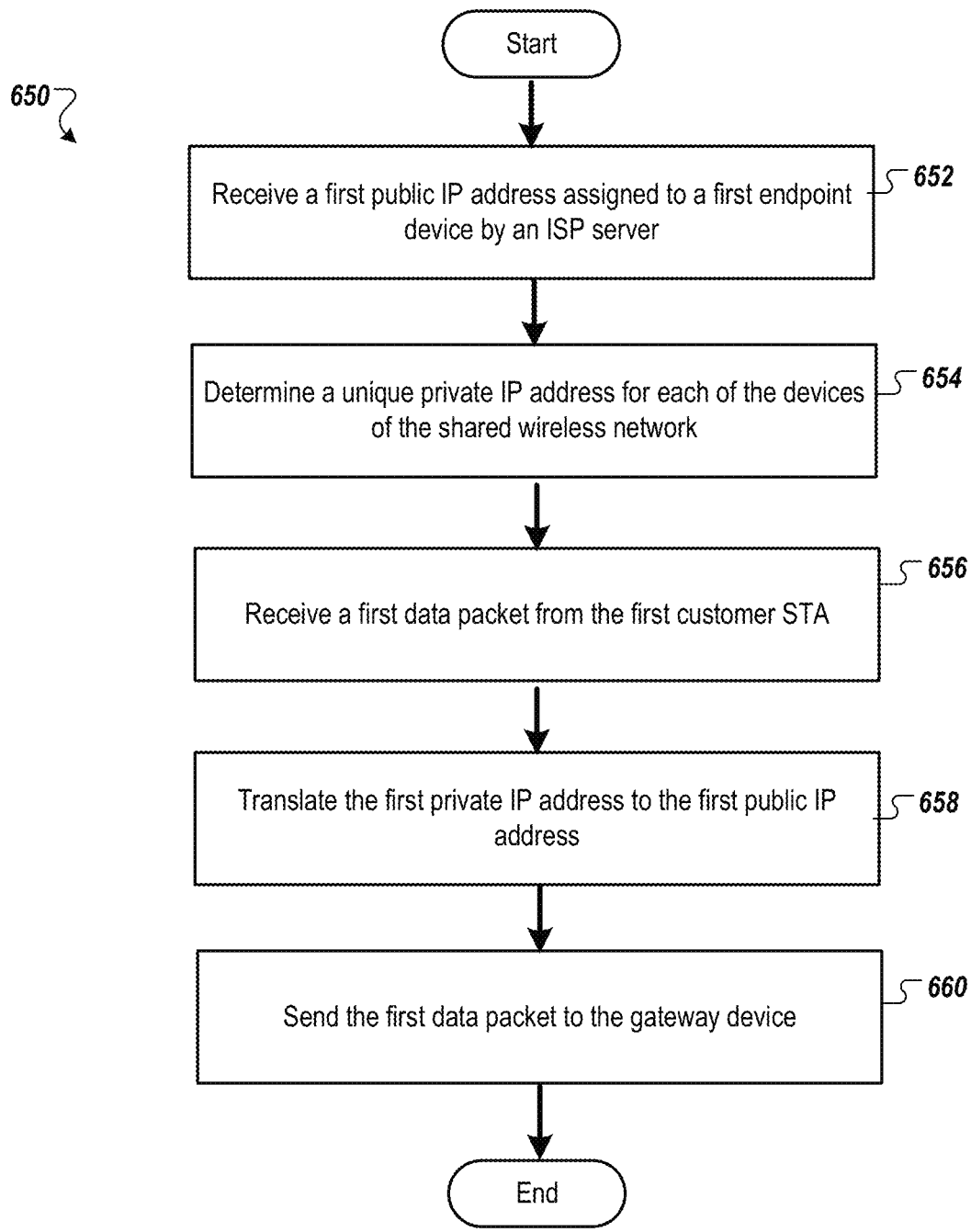
FIG. 6B is a flow diagram of a method of using a logical channel between a first device and an endpoint device in a shared wireless network according to one embodiment.

FIG. 6B is a flow diagram of a method of using a logical channel between a first device and an endpoint device in a shared wireless network according to one embodiment. The method 650 may be performed by processing logic that comprises hardware (e.g., circuitry, dedicated logic, programmable logic, microcode, etc.), software, firmware, or a combination thereof. In one embodiment, the method 650 may be performed by any of the devices described herein and illustrated with respect to FIGS. 1-5.

Referring back to FIG. 6B, the method 650 begins by receiving a first public IP address assigned to a first endpoint device by an ISP server (block 652). The first public IP address can be provided by the ISP server or can be stored in a database that is accessible by the processing logic. The wireless network includes multiple endpoint devices and multiple customer STAs. The processing logic determines a unique private IP address for each of the devices of the shared wireless network (block 654). In one embodiment, the processing logic determines the unique private IP address for each of the devices by algorithmically deriving the unique private IP address. That is, each device in the wireless network can algorithmically derive the unique private IP addresses of any other device. The processing logic receives a first data packet from the first customer STA (block 656). The first data packet includes a first private IP address assigned to the first customer STA. The first data packet originated from the first endpoint device using a second private IP address assigned to the first endpoint device. The processing logic translates the first private IP address to the first public IP address (block 658). The processing logic sends the first data packet to the gateway device (block 660).

In a further embodiment, the processing logic receives a second public IP address assigned to a second endpoint device by the gateway device. The processing logic receives a second data packet from the first customer STA. The second data packet includes the first private IP address assigned to the first customer STA. The second data packet originated from the second endpoint device using a third private IP address assigned to the second endpoint device. The processing logic translates the first private IP address to the second public IP address and sends the second data packet to the gateway device.

In another embodiment, the processing logic receives a third data packet from the gateway device, the third data packet being directed to the second public IP address. The processing logic translates the second public IP address to the first private IP address and sends the third data packet to the first customer STA based on the third private IP address. The first customer STA translates the third private IP address to the fourth private IP address and sends the third data packet to the second endpoint device.

In another embodiment, the processing logic receives a second public IP address assigned to a second endpoint device by the gateway device. The processing logic receives a second data packet from a second customer STA. The second data packet includes a third private IP address assigned to the second customer STA. The second data packet originated from the second endpoint device using a fourth private IP address assigned to the second endpoint device. The processing logic translates the third private IP address to the second public IP address and sends the second data packet to the gateway device. In a further embodiment, the processing logic receives a third data packet from the gateway device, the third data packet being directed to the second public IP address. The processing logic translates the second public IP address to the third private IP address assigned to the second customer STA and sends the third data packet to the second customer STA based on the third private IP address. The second customer STA translates the third private IP address to the fourth private IP address and sends the third data packet to the second endpoint device.

In another embodiment, the processing logic receives a second data packet from the gateway device, the second data packet being directed to the first public IP address. The processing logic translates the first public IP address to the first private IP address and sends the first data packet to the first customer STA based on the first private IP address. The first customer STA translates the first private IP address to the second private IP address and sends the first data packet to the first endpoint device.

In another embodiment, the processing logic establishes a first logical channel between the first endpoint device and the first device by i) generating a first entry in a first mapping table stored by the first device and ii) generating a second entry in a second mapping table stored by the first customer STA. The first entry maps the first public IP address to the first private IP address, the first private IP address identifying the first customer STA and the second entry maps the first private IP address to the second private IP address, the second private IP address identifying the first endpoint device.

In a further embodiment, the processing logic establishes a second logical channel between a second endpoint device and the first device by i) generating a third entry in the first mapping table stored by the first device and ii) generating a fourth entry in a third mapping table stored by the second customer STA. The third entry maps a second public IP address, assigned to the second endpoint device by the gateway device, to a third private IP address. The third private IP address identifies a second customer STA. The fourth entry maps the third private IP address to a fourth private IP address. The fourth private IP address identifies the second endpoint device.

Figure 7:
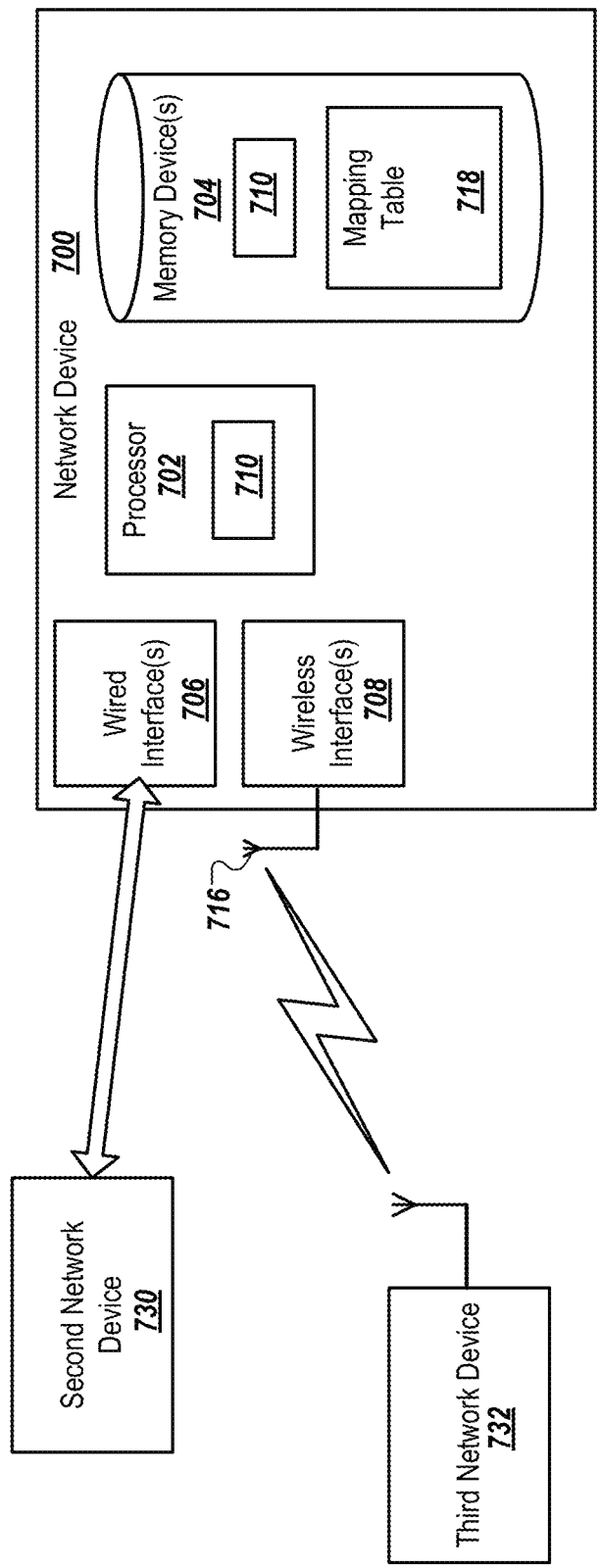
FIG. 7 is a block diagram of a network device that can be configured to create one or more logical channels in a cascaded star topology according to one embodiment.

FIG. 7 is a block diagram of a network device 700 that can be configured to create one or more logical channels in a cascaded star topology according to one embodiment. In FIG. 7, the network device 700 includes one or more processors 702 (hereinafter referred to as "processor"), one or more memory devices 704 (hereinafter referred to as "memory device"), one or more wired interfaces 706, and one or more wireless interfaces 708. For the one or more wired interfaces 706, the network device 700 can include one or more hardware ports (not illustrated in FIG. 7). For the one or more wireless interfaces 708, the network device 700 can include one or more radios (not illustrated in FIG. 7) and one or more antennas 716.

The processor 702 can be various type of processing devices, such as one or more Central Processing Units (CPUs), microcontrollers, field programmable gate arrays, or other types of processors or processing devices. The processor 702 can implement processing logic 710 that comprises hardware (e.g., circuitry, dedicated logic, programmable logic, microcode, etc.), software, firmware, or a combination thereof. The processing logic 710 can configure the network device 700 to operate according to the method 600 to establish one or more logical channels using information in the mapping table 718. The mapping table 718 can store the mappings that define portions of the logical channel. The mapping table 718 can integrate SNAT and DNAT rules, as described herein. Alternatively, the processing logic 710 can establish sub-interfaces and SNAT and DNAT rules without the using of a mapping table. The memory device 704 can be any type of memory or storage device and can store instructions that implement the processing logic 710 and the mapping table 718. The processor 702 can communicate with other devices over the wired interfaces 706 and wireless interfaces 708. The wireless interfaces 708 can implement one or more types of radio technologies, such as, for example, Wireless Local Area Network (WLAN) technologies, Wireless Personal Area Network (WPAN) technologies, cellular technologies, Long Range (LoRa) technologies, Body Area Network (BAN) technologies, Near-Me (NAN) technologies, or the like.

In one embodiment, the one or more memory devices 704 store device role information and node configuration information. The device role information can include device settings for each of the following device roles: a RT role, a BS role, a RL role, a GW role, a customer STA role, a NAS role, or the like. The node configuration information can include node settings for each of the device roles within each of the following node types: BSN, RLN, or CPE node. The node configuration information can also include information about the hardware available at the network device 700, including hardware that is plugged into the hardware ports of the network device 700. For example, the node configuration information can be determined during a boot-up process, such as by the Basic Input/output System (BIOS). The device role information and the node configuration information can be stored in memory, registers, a specified file, or the like. The node configuration information can also include an indication of whether a storage device is attached to a hardware port of the network device 700. The device role information can be used to allow the network device 700 to be configured as one of the types of devices described herein. The node configuration information can include information about the connections of the network device 700. For example, the node configuration information can list each of the external connections to other devices, such as over wired interfaces or wireless interfaces. In one embodiment, the node configuration information includes an IP address for a WAN port. In other embodiments, the node configuration information includes IP addresses of a private subnet. As described herein, the node configuration information can be used by the network device 700 to be configured according to a specific role for the network device 700, depending on where the network device 700 is disposed in the cascaded star topology.

During operation and after a power-up event, the processor can configure the device role and node configuration using the device role information and the node configuration information. The operations to perform the device role process can be done by the processing logic 710.

In other embodiments, the network device 700 includes other components, such as peripheral ports, wired interface ports (e.g., Ethernet ports), directional antennas, omnidirectional antennas, serial interfaces (e.g., USB, PCIe, PSGMII), card readers, volatile memory, non-volatile memory, universal asynchronous receiver/transmitter (UART), general purpose input-output terminals, integrated radios with or without dedicated CPU cores, multilayer switch/router, pin connectors to allow external antennas to be coupled to the network device 700, RF modules, or the like.

In another embodiment, the wireless interface 708 can include a WAN interface that is operatively coupled to a gateway device of an ISP. The memory device 704 stores a first mapping table and instructions to create a logical channel between the network device 700 and a first endpoint device via a first customer STA in a wireless network. The processor 702, which is coupled to the memory device 704, is configured to execute the instructions to perform the following operations: i) receive a first public IP address assigned to a first endpoint device by the gateway device; ii) determine a unique private Internet Protocol (IP) address for each device of the wireless network; iii) create a first sub-interface on the WAN interface, the first sub-interface communicatively coupling the device to the first customer STA; iv) add a first source network address translation (SNAT) rule to the first sub-interface that translates the first public IP address to a first private IP address assigned to the first customer STA; v) add a first destination network address translation (DNAT) rule to the first sub-interface that translates the first private IP address to the first public IP address; and vi) cause the first customer STA to create a second sub-interface between the first customer STA and the first endpoint device, add a second SNAT rule to the second sub-interface that translates the first private IP address to a second private IP address assigned to the first endpoint device, and add a second DNAT rule to the second sub-interface that translates the second private IP address to the first private IP address.

In another embodiment, the network device 700 is the first customer STA that receives data from a router device and creates the second sub-interface between the first customer STA and the first endpoint device, add a second SNAT rule to the second sub-interface that translates the first private IP address to a second private IP address assigned to the first endpoint device, and add a second DNAT rule to the second sub-interface that translates the second private IP address to the first private IP address.

In a further embodiment, the wireless interface 708 includes a first radio coupled to the processor 702 and the processor 702 is configured to communicate with the first customer STA over a first wireless link between the first radio and a radio of the first customer STA. The wireless interface 708 can include a second radio coupled to the processor 702 and the processor 702 is configured to communicate with a second customer STA over a second wireless link between the second radio and a radio of the second customer STA. The processor 702 can communicate with the gateway device using the first radio, the second radio, or a third radio. Alternatively, the processor 702 can communicate with the gateway device via the wired interface 706.

In another embodiment, the processor 702 receives receive a second public IP address assigned to a second endpoint device by the gateway device. The processor 702 creates a third sub-interface on the WAN interface of the device. The third sub-interface communicatively couples the device to the first customer STA. The processor 702 adds a third SNAT rule to the third sub-interface that translates the second public IP address to the first private IP address assigned to the first customer STA. The processor 702 adds a third DNAT rule to the third sub-interface that translates the first private IP address to the second public IP address. The processor 702 causes the first customer STA to create a fourth sub-interface between the first customer STA and the second endpoint device, add a fourth SNAT rule to the fourth sub-interface that translates the first private IP address to a fourth private IP address assigned to the second endpoint device, and add a fourth DNAT rule to the fourth sub-interface that translates the fourth private IP address to the first private IP address. The processor 702 can send a table including: i) the first public IP address and a first device ID that identifies the first endpoint device; and ii) the second public IP address and a second device ID that identifies the second endpoint device. The table can be used by the gateway device to collect network usage and activities on a per-customer basis.

In another embodiment, the processor 702 receives a second public IP address assigned to a second endpoint device by the gateway device. The processor 702 creates a third sub-interface on the WAN interface of the device, the third sub-interface communicatively coupling the device to a second customer STA. The processor 702 adds a third SNAT rule to the third sub-interface that translates the second public IP address to a third private IP address assigned to the second customer STA first private IP address assigned to the first customer STA. The processor 702 adds a third DNAT rule to the third sub-interface that translates the third private IP address to the second public IP address. The processor 702 causes the second customer STA to create a fourth sub-interface between the second customer STA and the second endpoint device, add a fourth SNAT rule to the fourth sub-interface that translates the third private IP address to a fourth private IP address assigned to the second endpoint device, and add a fourth DNAT rule to the fourth sub-interface that translates the fourth private IP address to the third private IP address. The processor 702 can send a table including: i) the first public IP address and a first device ID that identifies the first endpoint device; and ii) the second public IP address and a second device ID that identifies the second endpoint device. The table can be used by the gateway device to collect and correlate network usage and activities on a per-customer basis.

As described herein, the processor 702 can route incoming packets and outgoing packets according to the logical channels. In one embodiment, the processor 702 receives a first data packet from the gateway device, the first data packet being directed to the first public IP address. The processor 702 translates the first public IP address to the first private IP address using the first SNAT rule. The processor 702 sends the first data packet to the first customer STA based on the first private IP address. The first customer STA translates the first private IP address to the second private IP address using the second SNAT rule and sends the first data packet to the first endpoint device. In another embodiment, the processor receives a first data packet from the first customer STA, the first data packet including the first private IP address. The first customer STA received the first data packet from the first endpoint device and translated the second private IP address to the first private IP address using the second DNAT rule. The processor 702 translates the first private IP address to the first public IP address using the first DNAT rule. The processor 702 sends the first data packet to the gateway device.

Figure 8:
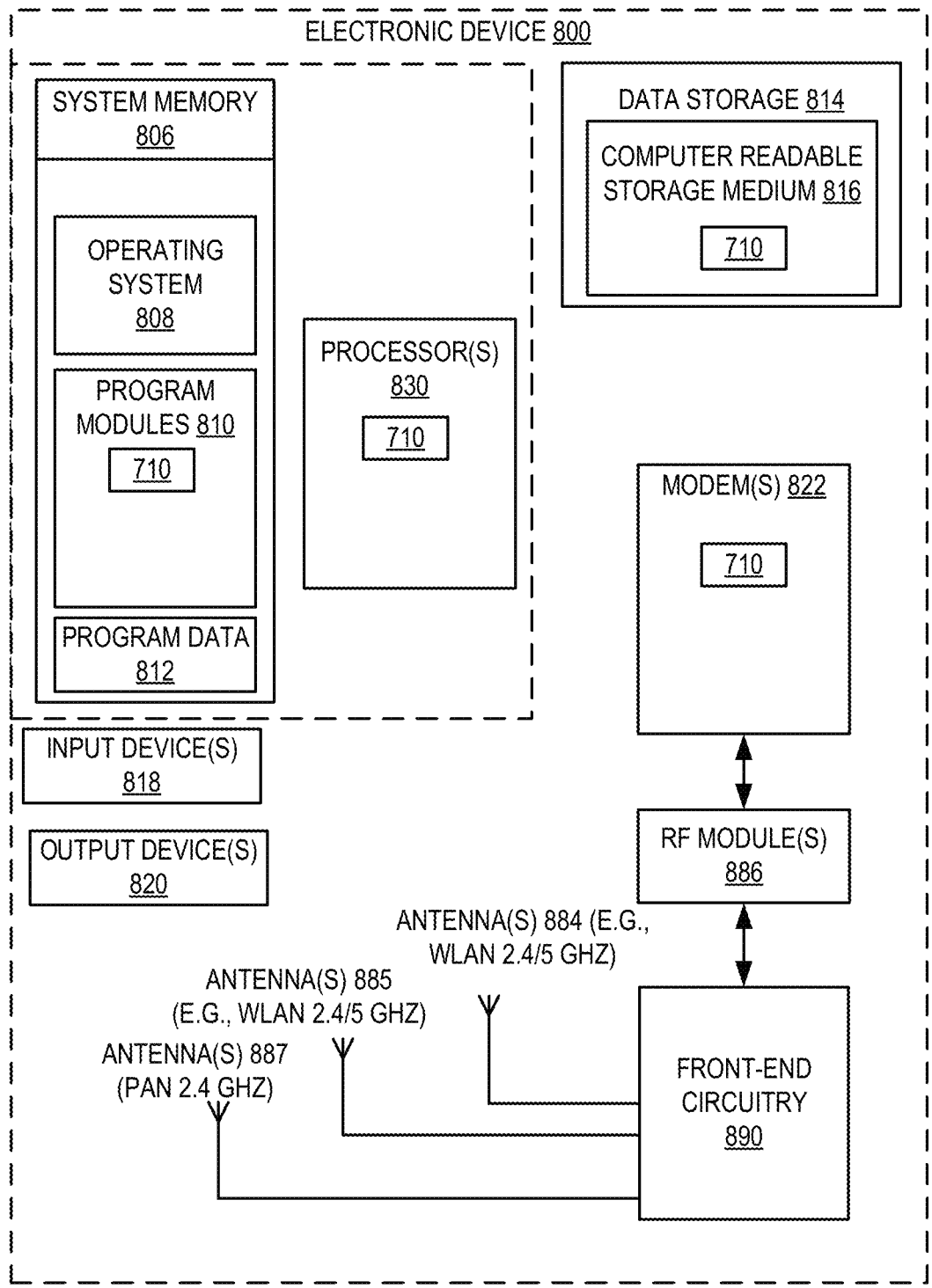
FIG. 8 is a block diagram of an electronic device that can be configured to create one or more logical channels in a cascaded star topology according to one embodiment.

FIG. 8 is a block diagram of an electronic device 800 that can be configured to create one or more logical channels in a cascaded star topology according to one embodiment. The electronic device 800 may correspond to the electronic devices described above with respect to FIGS. 1-7. Alternatively, the electronic device 800 may be other electronic devices, as described herein.

The electronic device 800 includes one or more processor(s) 830, such as one or more CPUs, microcontrollers, field programmable gate arrays, or other types of processors. The electronic device 800 also includes system memory 806, which may correspond to any combination of volatile and/or non-volatile storage mechanisms. The system memory 806 stores information that provides operating system component 808, various program modules 810, program data 812, and/or other components. In one embodiment, the system memory 806 stores instructions of methods to control operation of the electronic device 800. The electronic device 800 performs functions by using the processor(s) 830 to execute instructions provided by the system memory 806. In one embodiment, the program modules 810 may include processing logic 710. The processing logic 710 may perform some or all of the operations descried herein.

The electronic device 800 also includes a data storage device 814 that may be composed of one or more types of removable storage and/or one or more types of non-removable storage. The data storage device 814 includes a computer-readable storage medium 816 on which is stored one or more sets of instructions embodying any of the methodologies or functions described herein. Instructions for the program modules 810 (e.g., processing logic 710) may reside, completely or at least partially, within the computer-readable storage medium 816, system memory 806 and/or within the processor(s) 830 during execution thereof by the electronic device 800, the system memory 806 and the processor(s) 830 also constituting computer-readable media. The electronic device 800 may also include one or more input devices 818 (keyboard, mouse device, specialized selection keys, etc.) and one or more output devices 820 (displays, printers, audio output mechanisms, etc.).

The electronic device 800 further includes a modem 822 to allow the electronic device 800 to communicate via a wireless connections (e.g., such as provided by the wireless communication system) with other computing devices, such as remote computers, an item providing system, and so forth. The modem 822 can be connected to one or more radio frequency (RF) modules 886. The RF modules 886 may be a WLAN module, a WAN module, WPAN module, Global Positioning System (GPS) module, or the like. The antenna structures (antenna(s) 884, 885, 887) are coupled to the front-end circuitry 890, which is coupled to the modem 1022. The front-end circuitry 890 may include radio front-end circuitry, antenna switching circuitry, impedance matching circuitry, or the like. The antennas 884 may be GPS antennas, Near-Field Communication (NFC) antennas, other WAN antennas, WLAN or PAN antennas, or the like. The modem 822 allows the electronic device 800 to handle both voice and non-voice communications (such as communications for text messages, multimedia messages, media downloads, web browsing, etc.) with a wireless communication system. The modem 822 may provide network connectivity using any type of mobile network technology including, for example, Cellular Digital Packet Data (CDPD), General Packet Radio Service (GPRS), EDGE, Universal Mobile Telecommunications System (UMTS), Single-Carrier Radio Transmission Technology (1×RTT), Evaluation Data Optimized (EVDO), High-Speed Down-Link Packet Access (HSDPA), Wi-Fi®, Long Term Evolution (LTE) and LTE Advanced (sometimes generally referred to as 4G), etc.

The modem 822 may generate signals and send these signals to antenna(s) 884 of a first type (e.g., WLAN 5 GHz), antenna(s) 885 of a second type (e.g., WLAN 2.4 GHz), and/or antenna(s) 887 of a third type (e.g., WAN), via front-end circuitry 890, and RF module(s) 886 as descried herein. Antennas 884, 885, 887 may be configured to transmit in different frequency bands and/or using different wireless communication protocols. The antennas 884, 885, 887 may be directional, omnidirectional, or non-directional antennas. In addition to sending data, antennas 884, 885, 887 may also receive data, which is sent to appropriate RF modules connected to the antennas. One of the antennas 884, 885, 887 may be any combination of the antenna structures described herein.

In one embodiment, the electronic device 800 establishes a first connection using a first wireless communication protocol, and a second connection using a different wireless communication protocol. The first wireless connection and second wireless connection may be active concurrently, for example, if an electronic device is receiving a media item from another electronic device via the first connection) and transferring a file to another electronic device (e.g., via the second connection) at the same time. Alternatively, the two connections may be active concurrently during wireless communications with multiple devices. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna structure and the second wireless connection is associated with a second antenna.

Though a modem 822 is shown to control transmission and reception via antenna (884, 885, 887), the electronic device 800 may alternatively include multiple modems, each of which is configured to transmit/receive data via a different antenna and/or wireless transmission protocol.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to convey the substance of their work most effectively to others skilled in the art. An algorithm is used herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, Read-Only Memories (ROMs), compact disc ROMs (CD-ROMs) and magnetic-optical disks, Random Access Memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A wireless network comprising: a router device comprising a first storage device that stores a first mapping table; a first customer premises equipment (CPE) node comprising a first customer station (STA) and a first set of one or more endpoint devices, the first customer STA comprising a second storage device that stores a second mapping table; and a second CPE node comprising a second customer STA and a second set of one or more endpoint devices, the second customer STA comprising a third storage device that stores a third mapping table, wherein: the router device connects to an Internet Service Provider (ISP) server of an ISP; the router device is communicatively coupled to the first customer STA via a first wireless communication link and the second customer STA via a second wireless communication link; the first customer STA provides a first access point (AP) functionality to the first set; the second customer STA provides a second AP functionality to the second set; the router device and the first customer STA establish a first logical channel between the router device and a first endpoint device of the first set by i) creating a first entry in the first mapping table, wherein the first entry maps a first public Internet Protocol (IP) address provided by the ISP server for the first endpoint device to a first private IP address, wherein the first private IP address identifies the first customer STA, and ii) creating a second entry in the second mapping table, wherein the second entry maps the first private IP address to a second private IP address, wherein the second private IP address identifies the first endpoint device; and the router device and the second customer STA establish a second logical channel between the router device and a second endpoint device of the second set by iii) creating a third entry in the first mapping table, the third entry maps a second public IP address provided by the ISP server for the second endpoint device to a third private IP address, wherein the third private IP address identifies the second customer STA, and iv) creating a fourth entry in the third mapping table, the fourth entry maps the third private IP address to a fourth private IP address, wherein the fourth private IP address identifies the second endpoint device.

2. The wireless network of claim 1, wherein: the route device receives a first data packet from the ISP server, the first data packet being directed to the first public IP address; the router device translates, using the first mapping table, the first public IP address to the first private IP address; the router device sends the first data packet to the first customer STA based on the first private IP address; the first customer STA translates, using the second mapping table, the first private IP address to the second private IP address; and the first customer STA sends the first data packet to the first endpoint device based on the second private IP address.

3. The wireless network of claim 1, wherein: the first customer STA receives a first data packet from the first endpoint device, the first data packet comprising the second private IP address as a source address and a third public IP address as a destination address, the third public IP address being assigned by the ISP server; the first customer STA translates, using the second mapping table, the second private IP address to the first private IP address; the first customer STA sends the first data packet to the router device based on the first private IP address; the router device translates, using the first mapping table, the first private IP address to the first public IP address; and the router device sends the first data packet to the ISP server, the first data packet comprising the first public IP address as the source address.

4. A method comprising: receiving, by a first device of a wireless network, a first public Internet Protocol (IP) address assigned to a first endpoint device by a gateway device of an Internet service provider (ISP), wherein the wireless network comprises a plurality of endpoint devices and a plurality of customer stations (STAs); determining, by the first device, a unique private IP address for each of the first endpoint device, the plurality of endpoint devices, and the plurality of customer STAs; receiving, by the first device, a first data packet from the first customer STA, the first data packet comprising a first private IP address assigned to the first customer STA, wherein the first data packet originated from the first endpoint device using a second private IP address assigned to the first endpoint device; translating, by the first device, the first private IP address to the first public IP address; and sending, by the first device, the first data packet to the gateway device.

5. The method of claim 4, further comprising sending, by the first device to the gateway device, data comprising the first public IP address and a device identifier (ID) that identifies the first endpoint device.

6. The method of claim 4, further comprising: receiving, by the first device, a second public IP address assigned to a second endpoint device by the gateway device; receiving, by the first device, a second data packet from the first customer STA, the second data packet comprising the first private IP address assigned to the first customer STA, wherein the second data packet originated from the second endpoint device using a third private IP address assigned to the second endpoint device; translating, by the first device, the first private IP address to the second public IP address; and sending, by the first device, the second data packet to the gateway device.

7. The method of claim 6, further comprising sending, by the first device to the gateway device, data comprising i) the first public IP address and a first device identifier (ID) that identifies the first endpoint device; and ii) the second public IP address and a second device ID that identifies the second endpoint device.

8. The method of claim 6, further comprising: receiving, by the first device, a third data packet from the gateway device, the third data packet being directed to the second public IP address; translating, by the first device, the second public IP address to the first private IP address; and sending, by the first device, the third data packet to the first customer STA based on the third private IP address, the first customer STA to translate the third private IP address to a fourth private IP address and send the third data packet to the second endpoint device.

9. The method of claim 4, further comprising: receiving, by the first device, a second public IP address assigned to a second endpoint device by the gateway device; receiving, by the first device, a second data packet from a second customer STA, the second data packet comprising a third private IP address assigned to the second customer STA, wherein the second data packet originated from the second endpoint device using a fourth private IP address assigned to the second endpoint device; translating, by the first device, the third private IP address to the second public IP address; and sending, by the first device, the second data packet to the gateway device.

10. The method of claim 9, further comprising sending, by the first device to the gateway device, data comprising i) the first public IP address and a first device identifier (ID) that identifies the first endpoint device; and ii) the second public IP address and a second device ID that identifies the second endpoint device.

11. The method of claim 9, further comprising: receiving, by the first device, a third data packet from the gateway device, the third data packet being directed to the second public IP address; translating, by the first device, the second public IP address to the third private IP address assigned to the second customer STA; and sending, by the first device, the third data packet to the second customer STA based on the third private IP address, the second customer STA to translate the third private IP address to the fourth private IP address and send the third data packet to the second endpoint device.

12. The method of claim 4, further comprising: receiving, by the first device, a second data packet from the gateway device, the second data packet being directed to the first public IP address; translating, by the first device, the first public IP address to the first private IP address; and sending, by the first device, the first data packet to the first customer STA based on the first private IP address, the first customer STA to translate the first private IP address to the second private IP address and send the first data packet to the first endpoint device.

13. The method of claim 4, further comprising: establishing, by the first device, a first logical channel between the first endpoint device and the first device by i) generating a first entry in a first mapping table stored by the first device, the first entry maps the first public IP address to the first private IP address, wherein the first private IP address identifies the first customer STA and ii) generating a second entry in a second mapping table stored by the first customer STA, wherein the second entry maps the first private IP address to the second private IP address, wherein the second private IP address identifies the first endpoint device.

14. The method of claim 13, further comprising: establishing, by the first device, a second logical channel between a second endpoint device and the first device by i) generating a third entry in the first mapping table stored by the first device, wherein the third entry maps a second public IP address, assigned to the second endpoint device by the gateway device, to a third private IP address, wherein the third private IP address identifies a second customer STA and ii) generating a fourth entry in a third mapping table stored by the second customer STA, wherein the fourth entry maps the third private IP address to a fourth private IP address, wherein the fourth private IP address identifies the second endpoint device.

15. A device comprising: a wide area network (WAN) interface operatively coupled to a gateway device of an Internet Service Provider (ISP); a memory device that stores a first mapping table and instructions that, when executed by a processing device, cause the processing device to create a logical channel between the device and a first endpoint device via a first customer station (STA) in a wireless network; and the processing device coupled to the memory device, wherein the processing device is configured to execute the instructions to perform operations comprising: receive a first public IP address assigned to a first endpoint device by the gateway device; determine a unique private Internet Protocol (IP) address for each device of the wireless network; receive a first data packet from the first customer STA, the first data packet comprising a first private IP address assigned to the first customer STA, wherein the first data packet originated from the first endpoint device using a second private IP address assigned to the first endpoint device; translate the first private IP address to the first public IP address; and send the first data packet to the gateway device.

16. The device of claim 15, further comprising: a first radio coupled to the processing device, wherein the processing device is configured to communicate with the first customer STA over a first wireless link between the first radio and a radio of the first customer STA; and a second radio coupled to the processing device, wherein the processing device is configured to communicate with a second customer STA over a second wireless link between the second radio and a radio of the second customer STA.

17. The device of claim 15, wherein the operations further comprise: receive a second public IP address assigned to a second endpoint device by the gateway device; receive a second data packet from the first customer STA, the second data packet comprising the first private IP address assigned to the first customer STA, wherein the second data packet originated from the second endpoint device using a third private IP address assigned to the second endpoint device; translate the first private IP address to the second public IP address; and send the second data packet to the gateway device.

18. The device of claim 15, wherein the operations further comprise: receive a second public IP address assigned to a second endpoint device by the gateway device; receive a second data packet from a second customer STA, the second data packet comprising a third private IP address assigned to the second customer STA, wherein the second data packet originated from the second endpoint device using a fourth private IP address assigned to the second endpoint device; translate the third private IP address to the second public IP address; and send the second data packet to the gateway device.

19. The device of claim 15, wherein the operations further comprise: receive a second data packet from the gateway device, the second data packet being directed to the first public IP address; translate the first public IP address to the first private IP address; and send the first data packet to the first customer STA based on the first private IP address, the first customer STA to translate the first private IP address to the second private IP address and send the first data packet to the first endpoint device.

20. The device of claim 15, wherein the operations further comprise: establish the logical channel between the first endpoint device and the first device by i) generating a first entry in a first mapping table stored by the device, the first entry maps the first public IP address to the first private IP address, wherein the first private IP address identifies the first customer STA and ii) generating a second entry in a second mapping table stored by the first customer STA, wherein the second entry maps the first private IP address to the second private IP address, wherein the second private IP address identifies the first endpoint device.

\* \* \* \* \*